United States Patent
Negoro et al.

(10) Patent No.: US 7,855,677 B2
(45) Date of Patent: Dec. 21, 2010

(54) CODE GENERATION APPARATUS

(75) Inventors: Noboru Negoro, Osaka (JP); Takeshi Fukuda, Osaka (JP); Hiroyuki Sakai, Kyoto (JP)

(73) Assignee: Panasonic Corporation, Osaka (JP)

( * ) Notice: Subject to any disclaimer, the term of this patent is extended or adjusted under 35 U.S.C. 154(b) by 254 days.

(21) Appl. No.: 12/294,105

(22) PCT Filed: Apr. 3, 2007

(86) PCT No.: PCT/JP2007/057490
§ 371 (c)(1),
(2), (4) Date: Sep. 23, 2008

(87) PCT Pub. No.: WO2007/116890
PCT Pub. Date: Oct. 18, 2007

(65) Prior Publication Data
US 2009/0135053 A1    May 28, 2009

(30) Foreign Application Priority Data
Apr. 4, 2006  (JP) .............................. 2006-103430

(51) Int. Cl.
G01S 13/00  (2006.01)
H04B 1/00   (2006.01)
H04B 14/04  (2006.01)
H04L 27/00  (2006.01)

(52) U.S. Cl. .................... 342/195; 342/70; 342/159; 342/175; 375/130; 375/135; 375/242; 375/295

(58) Field of Classification Search ............ 342/70–72, 342/159, 112, 113, 115, 116, 162, 175, 195; 375/130, 137, 241–254, 295–308
See application file for complete search history.

(56) References Cited

U.S. PATENT DOCUMENTS 4,078,234 A * 3/1978 Fishbein et al. ............. 342/110

(Continued)

FOREIGN PATENT DOCUMENTS

JP    7-086984 A    3/1995

(Continued)

OTHER PUBLICATIONS

English language Abstract and partial translation of JP 7-321611 A.

(Continued)

*Primary Examiner*—Thomas H Tarcza
*Assistant Examiner*—Peter M Bythrow
(74) *Attorney, Agent, or Firm*—Greenblum & Bernstein P.L.C.

(57) ABSTRACT

The code generation apparatus includes: a clock generator which generates a clock signal of a first frequency; a timing controller which generates a timing signal of a second frequency lower than the first frequency; a code table storage in which a plurality of code sequences serving as a source for a pseudo-noise code is stored; an address controller which selects, according to the timing signal, a code sequence to be read, from among a plurality of code sequences; a partial code sequence extractor which extracts, as a partial code sequence, a code of a predetermined length, from the code sequence to be read; and a parallel-series convertor which outputs the partial code sequence one bit at a time, according to the clock signal.

9 Claims, 18 Drawing Sheets

U.S. PATENT DOCUMENTS

| | | | |
|---|---|---|---|
| 4,142,189 A * | 2/1979 | Gleason | 342/109 |
| 4,759,034 A * | 7/1988 | Nagazumi | 375/142 |
| 4,953,178 A * | 8/1990 | Ishigaki | 375/141 |
| 4,977,578 A * | 12/1990 | Ishigaki et al. | 375/140 |
| 5,291,202 A * | 3/1994 | McClintock | 342/16 |
| 5,657,021 A * | 8/1997 | Ehsani-Nategh et al. | 342/70 |
| 5,731,781 A * | 3/1998 | Reed | 342/135 |
| 5,731,782 A * | 3/1998 | Walls | 342/145 |
| 6,313,782 B1 * | 11/2001 | Lehan et al. | 342/16 |
| 7,460,055 B2 * | 12/2008 | Nishijima et al. | 342/70 |
| 7,642,952 B2 * | 1/2010 | Fukuda | 342/175 |
| 7,714,777 B2 * | 5/2010 | Fukuda | 342/175 |
| 2003/0090405 A1* | 5/2003 | Rauch et al. | 342/21 |
| 2007/0109175 A1* | 5/2007 | Fukuda | 342/70 |
| 2007/0285307 A1* | 12/2007 | Nishijima et al. | 342/200 |
| 2008/0204307 A1* | 8/2008 | Fukuda | 342/175 |

FOREIGN PATENT DOCUMENTS

| | | |
|---|---|---|
| JP | 7-321611 A | 12/1995 |
| JP | 2800808 B2 | 7/1998 |
| JP | 2001-022636 A | 1/2001 |
| JP | 2001-024624 A | 1/2001 |

OTHER PUBLICATIONS

English language Abstract of JP 2001-022636 A.
English language Abstract of JP 2001-024624 A.
English language Abstract of JP 7-086984 A.
English language partial translation of JP 2800808 B2.
English language Abstract of JP 10-145332 A.
U.S. Appl. No. 11/816,794 to Fukuda, filed Aug. 21, 2007.
U.S. Appl. No. 12/038,198 to Negoro et al, filed Feb. 27, 2008.

* cited by examiner

FIG. 7

| Address | C1 | C2 | C3 | C4 | C5 | C6 | C7 | C8 | C9 | C10 | C11 | C12 | C13 | C14 | C15 | C16 | C17 | C18 | C19 | C20 | C21 | C22 | C23 | C24 | C25 | C26 | C27 | C28 | C29 | C30 |
|---|---|---|---|---|---|---|---|---|---|---|---|---|---|---|---|---|---|---|---|---|---|---|---|---|---|---|---|---|---|---|
| R1 | 1 | 2 | 3 | 4 | 5 | 6 | 7 | 8 | 9 | 10 | 11 | 12 | 13 | 14 | 15 | A1 | A2 | A3 | A4 | A5 | A6 | A7 | A8 | A9 | A10 | A11 | A12 | A13 | A14 | A15 |
| R2 | 9 | 10 | 11 | 12 | 13 | 14 | 15 | 16 | 17 | 18 | 19 | 20 | 21 | 22 | 23 | A9 | A10 | A11 | A12 | A13 | A14 | A15 | A16 | A17 | A18 | A19 | A20 | A21 | A22 | A23 |
| R3 | 17 | 18 | 19 | 20 | 21 | 22 | 23 | 24 | 25 | 26 | 27 | 28 | 29 | 30 | 31 | A17 | A18 | A19 | A20 | A21 | A22 | A23 | A24 | A25 | A26 | A27 | A28 | A29 | A30 | A31 |
| R4 | 25 | 26 | 27 | 28 | 29 | 30 | 31 | 32 | 33 | 34 | 35 | 36 | 37 | 38 | 39 | A25 | A26 | A27 | A28 | A29 | A30 | A31 | A32 | A33 | A34 | A35 | A36 | A37 | A38 | A39 |
| ... | | | | | | | | | | | | | | | | | | | | | | | | | | | | | | |
| R14 | 105 | 106 | 107 | 108 | 109 | 110 | 111 | 112 | 113 | 114 | 115 | 116 | 117 | 118 | 119 | A105 | A106 | A107 | A108 | A109 | A110 | A111 | A112 | A113 | A114 | A115 | A116 | A117 | A118 | A119 |
| R15 | 113 | 114 | 115 | 116 | 117 | 118 | 119 | 120 | 121 | 122 | 123 | 124 | 125 | 126 | 127 | A113 | A114 | A115 | A116 | A117 | A118 | A119 | A120 | A121 | A122 | A123 | A124 | A125 | A126 | A127 |
| R16 | 121 | 122 | 123 | 124 | 125 | 126 | 127 | 1 | 2 | 3 | 4 | 5 | 6 | 7 | 8 | A121 | A122 | A123 | A124 | A125 | A126 | A127 | A1 | A2 | A3 | A4 | A5 | A6 | A7 | A8 |

180

Basic part / Redundant part = First code sequence part
Basic part / Redundant part = Second code sequence part

CODE GENERATION APPARATUS

TECHNICAL FIELD

The present invention relates to a code generation apparatus used in a radar apparatus using a spread spectrum scheme, and relates in particular to a code generation apparatus which can generate a code at a high-speed chip rate.

BACKGROUND ART

Recent years have seen active development of technology related to a radar apparatus equipped on a vehicle (hereinafter, referred to as an in-vehicle radar apparatus). As an example, a radar apparatus using a direct sequence spread spectrum scheme (hereinafter, referred to as a DS-SS radar apparatus) is proposed.

Specifically, the DS-SS radar apparatus modulates (spreads), at a transmitting side, a narrow-band signal into a broad-band signal using a spread code, and transmits, as a radar wave, the broad-band signal obtained through the modulation. At a receiving side, the DS-SS radar apparatus receives a reflected wave that is obtained when the transmitted radar wave is reflected from an object, and demodulates (despreads) the received signal, which is received using the spread code, into the initial narrow-band signal. At the time, a spread code identical to the spread code used for modulating a narrow-band signal into a broad-band signal at the transmitting side is generated at the receiving side, by shifting the spread code by a length equal to or smaller than the bit width of the code. Between the generated spread code and the received signal, a correlation operation (despreading) is performed each time. A narrow-band signal can be obtained when the shifting of the spread code, being shifted little by little, reaches the amount of displacement corresponding to the propagation time from the transmission of the radar wave until the reception of the reflected wave obtained when the transmitted radar wave is reflected from the object. The correlation operation is repeatedly performed until reaching the amount of displacement corresponding to the scan range. Here, the amount of displacement per correlation operation, that is, the bit width of the spread code determines the distance resolution of the radar apparatus. Thus, the narrower the bit width of the code is, that is, the higher the chip rate of the code is, the radar apparatus is considered as having higher resolution.

In addition, an in-vehicle radar apparatus is used in the detection of a vehicle ahead and a rear obstacle for purposes such as: safety improvements including collision avoidance, improvement of conveniences as represented by vehicle reversing aids, and improvements in drivability such as automated cruise. In such purposes, it is necessary to suppress the influences of unnecessary radio waves, such as interference by electromagnetic waves emitted by a radar apparatus of the same kind that is equipped on a vehicle other than the current vehicle.

For this reason, for a spread code used for the DS-SS radar apparatus, it is preferable that the code should have excellent cross-correlation property which enables a vehicle to avoid interference with the radar wave from an apparatus of the same kind equipped on another vehicle, and should also have excellent autocorrelation property which enables the vehicle to avoid interference with a radar wave transmitted from the vehicle. In addition, it is preferable that the DS-SS radar apparatus should have a function that allows conversion into an arbitrary spread code when interfered by a radar apparatus using the same spread code and equipped on another vehicle.

Additionally, when despreading is performed at the receiving side, it is necessary to generate, with respect to the spread code, a delay corresponding to the propagation time of the radar wave so as to correlate the spread code and the delay; therefore, a code generation apparatus capable of generating an arbitrary delay amount (delay time) is required. Furthermore, in the case where the radar apparatus is applied as a short-range radar, a distance resolution of a few centimeters is required, thus necessitating code generation at a high-speed chip rate.

Thus, generally, a pseudo-noise code (hereinafter, referred to as a PN code) having a common rule for both transmitting and receiving sides is used for the spread code. The representative code includes an M-sequence code and a Gold-sequence code.

FIGS. 1 and 2 are diagrams showing the structure of a PN code generator in conventional technology. As FIG. 1 shows, the PN code generator 12 includes a shift register 11 and an exclusive OR operation circuit (EX-OR) 13. Here, as an example, the shift register 11 is assumed as an n-staged shift resister. Then, the exclusive OR operation circuit (EX-OR) 13 performs exclusive OR operation on the logical values of the last stage and a mid stage of the shift register 11, so as to generate a PN code while causing the obtained logical value to be inputted into the initial stage. However, for the PN code generator 12 including the shift register 11, it is difficult to change the tap location at which to extract the logical value of the mid stage, and therefore it is difficult to change the PN code upon request.

In contrast, as FIG. 2 shows, the PN code generator 23 includes: a flash memory 23b; a write controller 23c for writing a code into the flash memory 23b; a read controller 23d that reads the code; and a micro processor unit (MPU) 23a that outputs the code from a designated address. The PN code generator 23 can generate a code having an arbitrary delay amount by generating an arbitrary code and designating a readout address (See, for example, Patent Reference 1).

Patent Reference 1: Japanese Unexamined Patent Application Publication No. H07-86984.

DISCLOSURE OF INVENTION

Problems that Invention is to Solve

However, the conventional PN code generator as described above (hereinafter, also referred to as a code generation apparatus) outputs a code according to the clock frequency of a storage apparatus in which the code is stored. Therefore, in the code generation unit using a conventional storage apparatus, the clock frequency, that is, the chip rate for determining the radar resolution is approximately a few hundred MHz. For example, in a radar apparatus, when the chip rate is 300 MHz, the distance resolution of the radar is approximately 0.5 m, which is approximately ten times higher than the distance resolution required for a short-range radar apparatus (approximately a few centimeters). Therefore, there is a problem that a high-resolution radar apparatus using a conventional code generation apparatus is difficult to realize.

Therefore, the present invention is conceived in view of the above problem, and it is an object of the present invention to provide a code generation apparatus which can generate a code at a high-speed chip rate using a conventional storage apparatus.

Means to Solve the Problems

To achieve the above object, the code generation apparatus according to the present invention includes: (a) (a1) a clock signal generation unit which generates a clock signal of a first frequency; (a2) a timing signal generation unit which generates, according to the clock signal, a timing signal of a second frequency lower than the first frequency; (a3) a storage unit in which a plurality of code sequences serving as a source for a pseudo-noise code is stored; (a4) a code sequence selection unit which selects, according to the timing signal, a code sequence to be read, from among the plurality of code sequences stored in the storage unit; (a5) a partial code sequence extraction unit which extracts, as a partial code sequence, a code of a predetermined bit length, from the code sequence selected by the code sequence selection unit; and (a6) a code output unit which outputs, by one bit at a time, according to the clock signal, the partial code sequence extracted by the partial code sequence extraction unit.

With this, it becomes possible to output a code with a clock signal of a higher speed than the timing signal, and to output the code at a high chip rate.

Furthermore, (b) in the storage unit, a bit width of a data bus at an output side to the partial code sequence extraction unit may be at least 2X−1 bit, in the case where the partial code sequence is X bit in size, and where the code sequence is at least 2X−1 bit in size.

Alternatively, (c) in the storage unit, a storage area in which the code sequence is stored may be a continuous space of at least 2X−1 bit, in the case where the partial code sequence is X bit in size, and where the code sequence is at least 2X−1 bit in size.

Alternatively, (d) in the storage unit, X−1 bit data from a code sequence that is subsequently selected by the code sequence selection unit may be stored in an X−1 bit storage area succeeding an X bit in the code sequence currently selected, in the case where the partial code sequence is X bit in size, and where the code sequence is at least 2X−1 bit in size.

With these, it becomes possible to shift the part extracted as a partial code sequence from the code sequence, and to readily generate an arbitrary delayed code through shifting as appropriate.

In addition, (e) the partial code sequence extraction unit includes: (e1) a first partial code sequence extraction unit which reads a first code sequence part from the code sequence selected by the code sequence selection unit, and which extracts a code of a predetermined bit length from the first code sequence part; (e2) a second partial code sequence extraction unit which reads a second code sequence part from the code sequence selected by the code sequence selection unit, and which extracts a code of a predetermined bit length from the second code sequence part; and (e3) a partial code sequence selection unit which alternately selects the first partial code sequence extraction unit and the second partial code sequence extraction unit, and which outputs, as the partial code sequence, the code of a predetermined bit length that is extracted by the selected one of the partial code sequence selection units.

With this, continuous partial code sequences are prepared and alternately outputted, thereby allowing operations at a frequency half as high as with the case where there is only one function which extracts the partial code sequence. Furthermore, the partial code sequence selection unit is only required to select which partial sequence to output and can therefore operate at high speed as compared to the storage unit, the first partial code sequence extraction unit, and the second partial code sequence extraction unit. As a result, the code generation apparatus can continue providing partial code sequences to the code output unit.

Note that the present invention may be implemented not only as a code generation apparatus, but also as: a code generation method for controlling the code generation apparatus, a radar apparatus which includes a code generation apparatus in one of a transmission pseudo-noise code generation apparatus and a reception pseudo-noise code generation apparatus, a spread spectrum apparatus including the code generation apparatus as a pseudo-noise code generation apparatus, and so on.

Effects of the Invention

According to the present invention, it is possible to generate a code using a clock signal having a higher speed than that of the timing signal which controls the output from a storage apparatus in which a plurality of code sequences that serves as a source for a pseudo-noise code is stored according to a predetermined rule. With this, it becomes possible to provide a high-resolution radar apparatus.

In addition, it becomes possible to generate a pseudo-noise code having an arbitrary code length and an arbitrary amount of delay, by shifting, as appropriate, a part to be extracted as a partial code sequence from a code sequence outputted from the storage apparatus in a predetermined order. With this, it becomes possible to achieve high interference resistance and dramatically-improved degrees of freedom in correlation operation.

BRIEF DESCRIPTION OF DRAWINGS

FIG. 7 is a diagram showing an exemplary variation of a code table stored in the code table storage unit in the first embodiment of the present invention.

NUMERICAL REFERENCES

Figure 1:
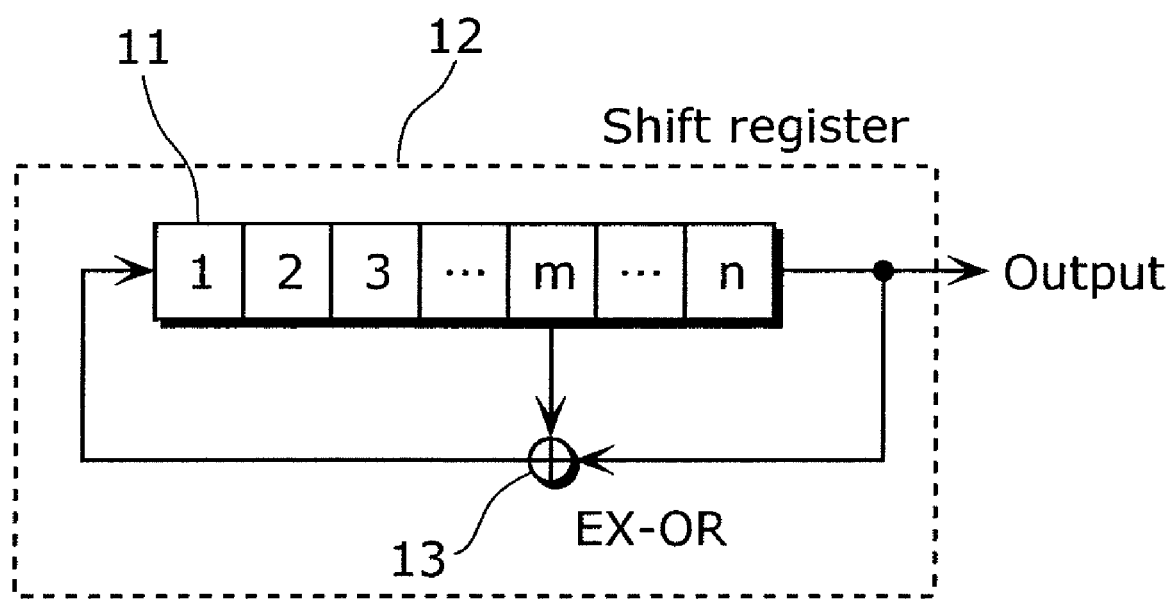
FIG. 1 is a first diagram showing the structure of a PN code generator in conventional technology related to the present invention.
Figure 2:
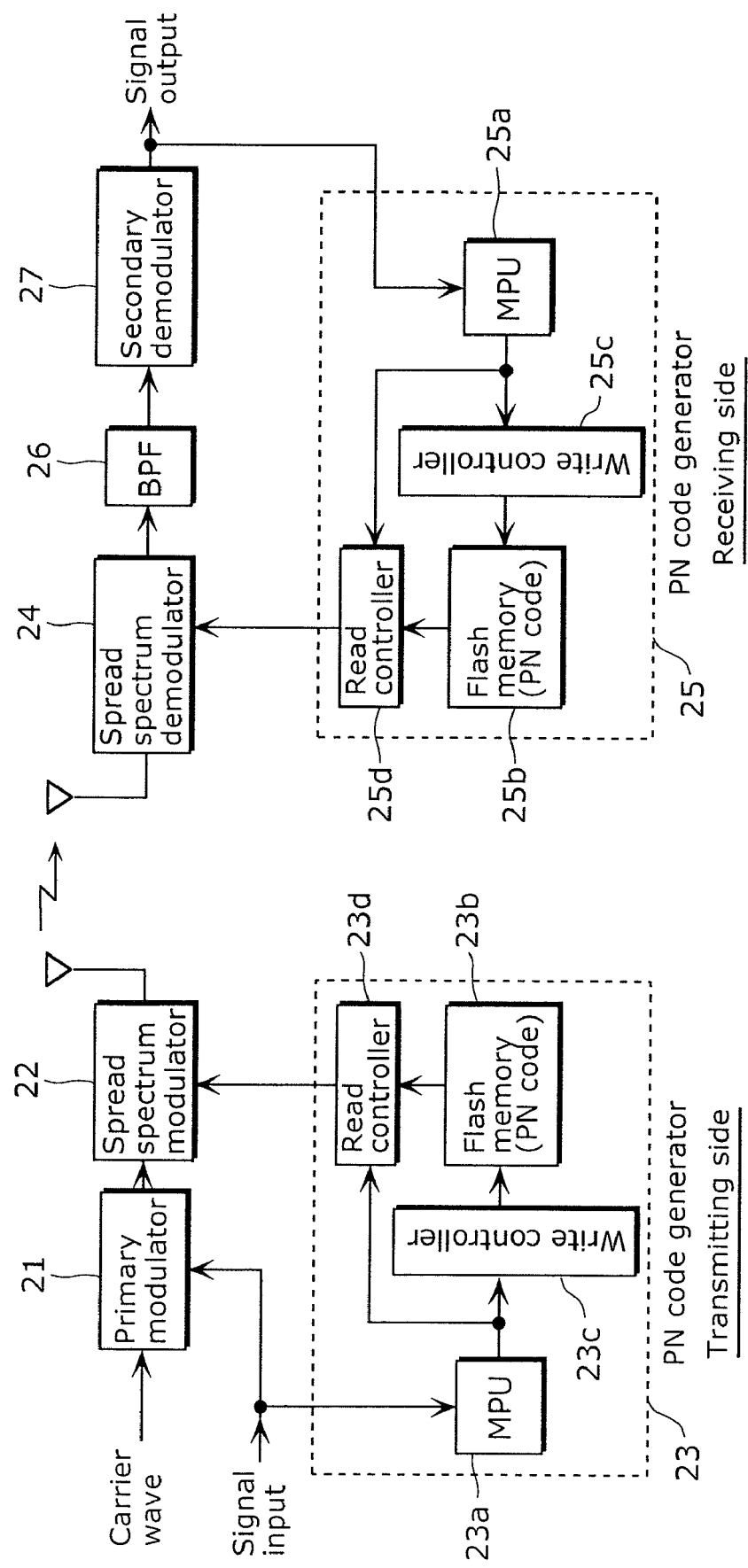
FIG. 2 is a second diagram showing the structure of the PN code generator in conventional technology related to the present invention.

11 Shift register
12 PN code generator
13 Exclusive OR operation circuit (EX-OR)
21 Primary modulator
22 Spread spectrum modulator
23, 25 PN code generator
23a, 25a Micro processor unit (MPU)
23b, 25b Flash memory
23c, 25c Write controller
23d, 25d Read controller
24 Spread spectrum demodulator
26 Band-pass filter
27 Secondary modulator
100 Spread spectrum radar apparatus
101 Transmission pseudo-noise code generation apparatus
102 Spread spectrum modulator
103 Signal source
104 Transmission antenna
105 Object, such as a vehicle ahead and an obstacle
106 Receiving antenna
107 Reception pseudo-noise code generation apparatus
108 Spread spectrum demodulator
109 Signal processing apparatus
110 Address control unit
120 Code table storage unit
130 Timing control unit
140 Partial code sequence extraction unit
141 Bit shift control circuit
142 Code selection circuit
150 Parallel-series conversion unit
151 Latch
152 Shift register
153 Reset signal generation circuit
160 Clock generation unit
161 Voltage control oscillator (VCO)
162 Divider
163 Phase frequency detector (PFD)
164 Loop filter (LPF)
170, 180 Code table
201 Code generation apparatus
210 Address control unit
220 Code table storage unit
230 Timing control unit
240a, 240b Partial code sequence extraction unit
250 Partial code sequence selection unit
270 Code table
271, 272 Code table region
301 Code generation apparatus
310 Clock signal supply unit
320 Write control unit
330 Code generation unit
331, 341 Shift register
332 Exclusive OR operation circuit (EX-OR)
340 Code sequence holding unit
400 Spread spectrum radar apparatus
401 Carrier wave supply source
402 Modulator
403 Data signal supply source
408 Demodulator

BEST MODE FOR CARRYING OUT THE INVENTION

First Embodiment

Hereinafter, a first embodiment of the present invention shall be described with reference to the drawings.

The code generation apparatus in the present embodiment includes characteristics shown in (a) to (d) below.

(a) The code generation apparatus includes the following functions: (a1) a clock signal generation function to generate a clock signal of a first frequency; (a2) a timing signal generation function to generate, according to the clock signal, a timing signal of a second frequency lower than the first frequency; (a3) a storage function to store a plurality of code sequences serving as a source for a pseudo-noise code; (a4) a code sequence selection function to select, according to the timing signal, a code sequence to be read, from among the plurality of code sequences stored by the storage function; (a5) a partial code sequence extraction function to extract, as a partial code sequence, a code of a predetermined bit length, from the code sequence selected by the code sequence selection function; and (a6) a code output function to output, by one bit at a time, according to the clock signal, the partial code sequence extracted by the partial code sequence extraction function.

(b) Assuming that the size of the partial code sequence is X bit and that the size of the partial code sequence is at least 2X−1 bit, in the storage function, the bit width of the data bus at an output side to the partial code sequence extraction function is at least 2X−1.

(c) Assuming that the size of the partial code sequence is X bit, and that the size of the code sequence is at least 2X−1 bit, the storage area in the storage function is a continuous space of at least 2X−1 bit.

(d) Assuming that the size of the partial code sequence is X bit, and that the size of the code sequence is at least 2X−1 bit, X−1 bit data of the code sequence that is subsequently selected by the code sequence selection function is stored in a continuous storage area of X−1 bit succeeding an X bit in the currently selected sequence.

Based on the above point, a code generation apparatus in the present embodiment shall be described.

Figure 3:
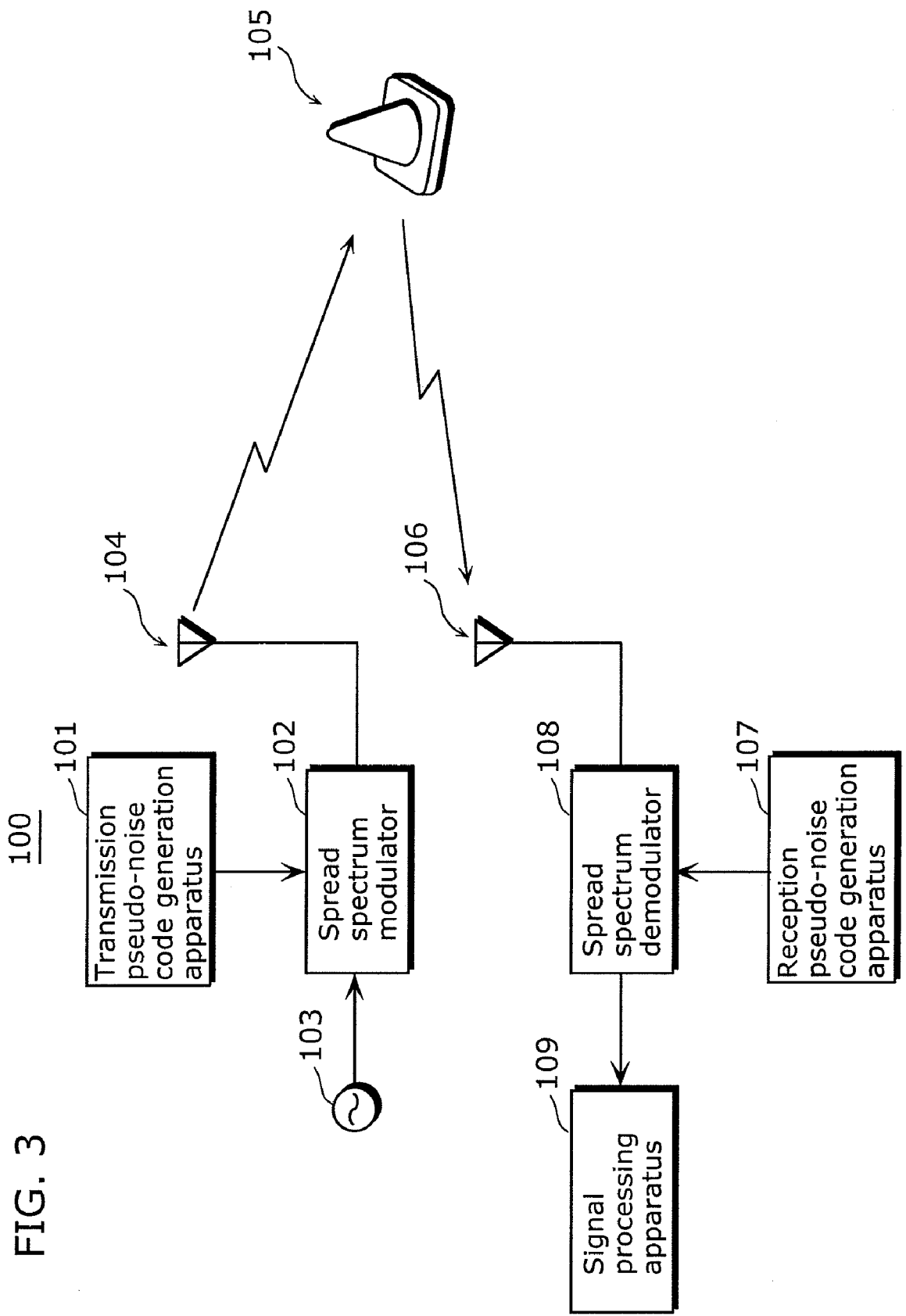
FIG. 3 is a diagram showing the structure of a spread spectrum radar apparatus including a code generation apparatus in a first embodiment of the present invention.

FIG. 3 is a diagram showing the structure of a spread spectrum radar apparatus including the code generation apparatus in the present embodiment. As FIG. 3 shows, a spread spectrum radar apparatus 100 spread-spectrum modulates a narrow-band signal into a broad-band signal using a transmission pseudo-noise code. The broad-band signal obtained by the spread modulation is transmitted as a radar wave. A reflected wave, which is obtained when the transmitted radar wave is reflected from an object, is received as a received signal. The received signal is spread-spectrum demodulated into a correlation signal using a reception pseudo-noise code. Based on the correlation signal obtained through the demodulation, whether or not an object is present as well as the distance and the relative speed of the object are calculated.

Here, as an example, the spread spectrum radar apparatus 100 includes: a transmission pseudo-noise code generation apparatus 101, a spread spectrum modulator 102, a signal source 103, a transmission antenna 104, a receiving antenna 106, and a reception pseudo-noise code generation apparatus 107, a spread spectrum demodulator 108, and a signal processing apparatus 109.

The transmission pseudo-noise code generation apparatus 101 generates a transmission pseudo-noise code and supplies the generated transmission pseudo-noise code to the spread spectrum modulator 102. Here, the transmission pseudo-noise code is a binary pseudo-noise code. As an example here, the transmission pseudo-noise code is an M-sequence code that is well-known as a pseudo-noise code.

The spread spectrum modulator 102 performs spread-spectrum modulation on the narrow-band signal supplied by the signal source 103, using a transmission pseudo-noise code supplied by the transmission pseudo-noise code generation apparatus 101, and performs signal processing, such as frequency conversion and amplification as necessary, to convert the narrow-band signal into a broad-band signal.

The signal source 103 generates a narrow-band signal, and supplies the generated narrow-band signal to the spread spectrum modulator 102.

The transmission antenna 104 transmits, as a radar wave, the broad-band signal obtained when converted by the spread spectrum modulator 102.

The receiving antenna 106 receives the reflected wave that is obtained when the radar wave is reflected from an object.

The reception pseudo-noise code generation apparatus 107 generates a reception pseudo-noise code and supplies the generated reception pseudo-noise code to the spread spectrum demodulator 108. Here, the reception pseudo-noise code is a pseudo-noise code that is a transmission pseudo-noise code with a time delay.

The spread spectrum demodulator 108 performs processing such as low noise amplification and frequency conversion as necessary on the received signal that is received through the receiving antenna 106, and performs spread-spectrum demodulation (correlation operation) using the reception pseudo-noise code supplied through the reception pseudo-noise code generation apparatus 107. The correlation signal obtained by the conversion is outputted to the signal processing apparatus 109.

The signal processing apparatus 109 calculates whether or not the object is present as well as the distance and the relative speed of the object, based on: the delay time of the reception pseudo-noise code with respect to the transmission pseudo-noise code; a narrow-band signal generated by the signal source 103; and the correlation signal outputted by the spread spectrum demodulator 108.

Note that the reception pseudo-noise code generation apparatus 107 is identical in structure to the transmission pseudo-noise code generation apparatus 101; therefore, only the transmission pseudo-noise code generation apparatus 101 shall be described, and the description of the reception pseudo-noise code generation apparatus 107 shall be omitted. Hereinafter, the transmission pseudo-noise code generation apparatus 101 is abbreviated to a code generation apparatus 101.

Figure 4:
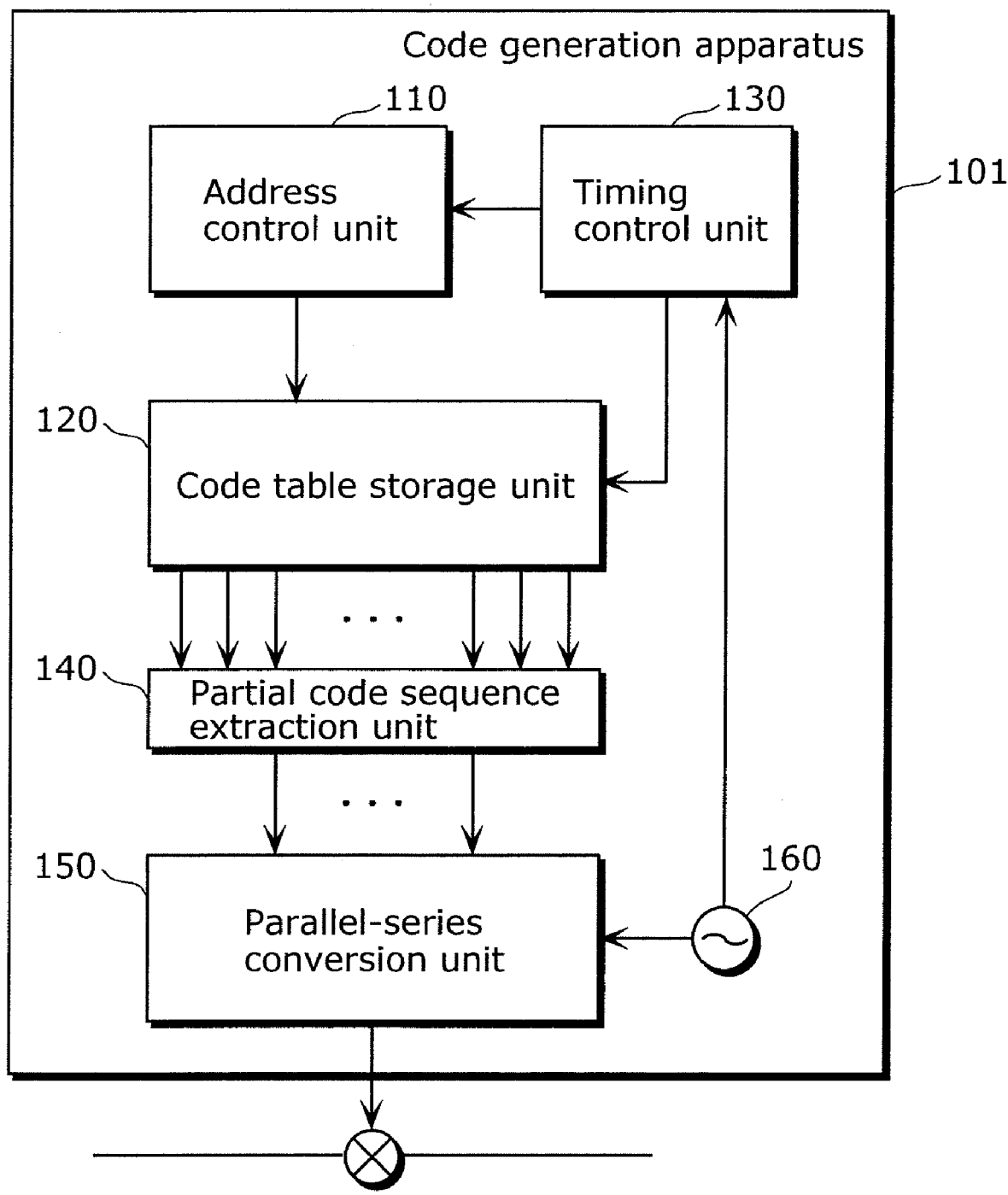
FIG. 4 is a diagram showing the structure of the code generation apparatus in the first embodiment of the present invention.
Figure 5:
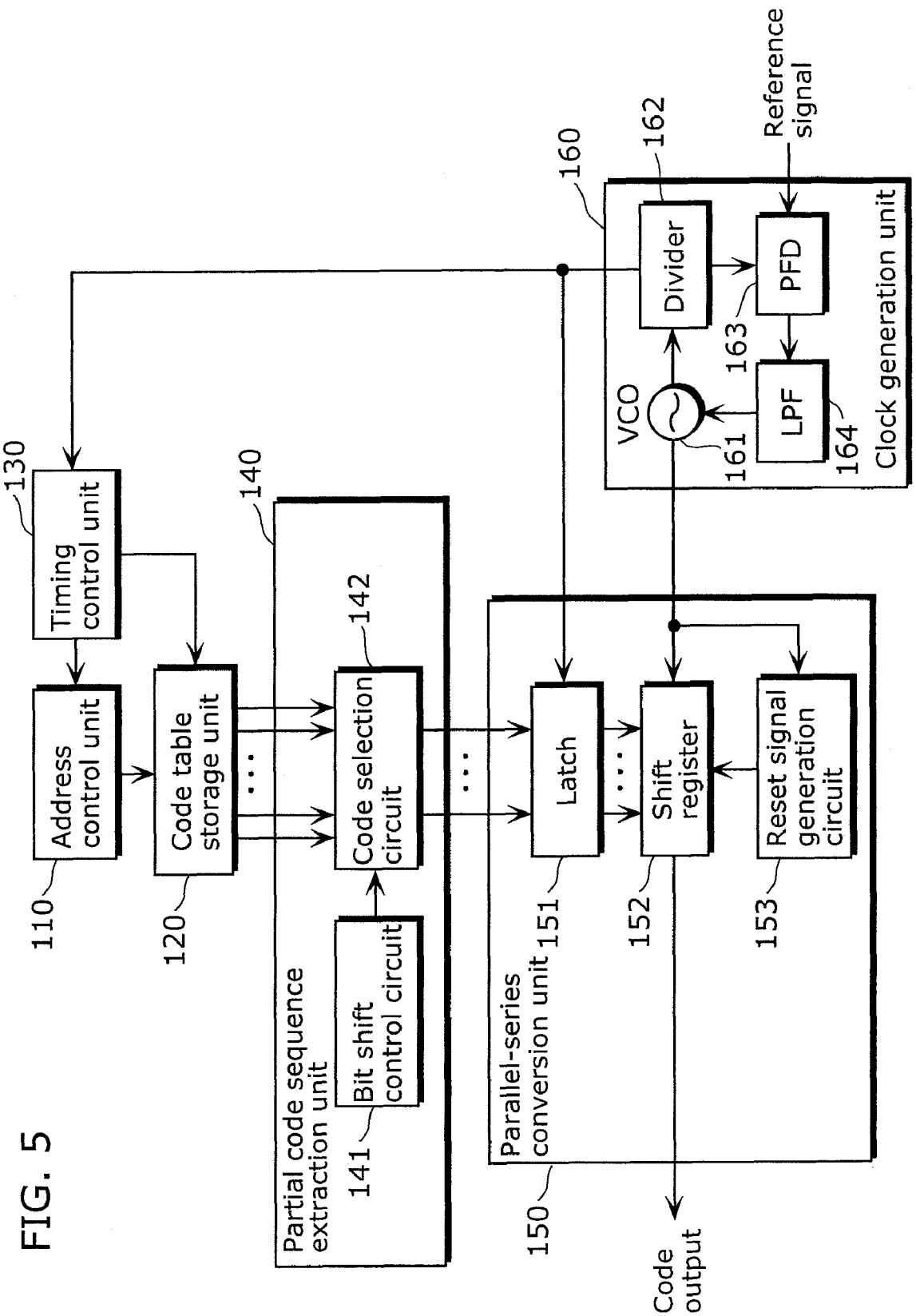
FIG. 5 is a diagram showing the detailed structure of the code generation apparatus in the first embodiment of the present invention.

FIGS. 4 and 5 are diagrams showing the structure of the code generation apparatus 101 in the present embodiment. As FIG. 4 shows, the code generation apparatus 101 includes: an address control unit 110, a code table storage unit 120, a timing control unit 130, a partial code sequence extraction unit 140, a parallel-series conversion unit 150, and a clock generation unit 160.

The address control unit 110 selects a code sequence to be read, from among the plurality of code sequences stored in the code table storage unit 120, according to the timing signal supplied by the timing control unit 130. At the time, the address control unit 110 generates an address for identifying the code sequence to be read, and outputs the generated address to the code table storage unit 120. Here, the code sequence refers to a code having a width of the data bus outputted in parallel from the code table storage unit 120. The address refers to an address which is separately assigned to each of the plurality of code sequences stored in the code table storage unit 120, and with which the code sequence to be read can be identified from among the plurality of code sequences.

The code table storage unit 120 stores a code table in which the plurality of code sequences that serves as a source for the pseudo-noise code is registered. From among the stored code table (the plurality of code sequences), the code sequence to be read is identified based on the address outputted by the address control unit 110. The identified code sequence to be read is outputted according to the timing signal supplied by the timing control unit 130.

The timing control unit 130 generates a timing signal of the second frequency that is lower than the first frequency, according to the clock signal supplied by the clock generation unit 160. The generated timing signal is supplied to the address control unit 110 and the code table storage unit 120. Note that the timing control unit 130 may generate the timing signal of the first frequency.

The partial code sequence extraction unit 140 extracts a code of a predetermined bit length as a partial code sequence, from the code sequence outputted by the code table storage unit 120, and outputs the extracted partial code sequence. Here, as an example, as FIG. 5 shows, the partial code sequence extraction unit 140 includes a bit shift control circuit 141 and a code selection circuit 142.

The bit shift control circuit 141 outputs a control signal for shifting the code sequence by a predetermined bit length.

The code selection circuit 142 shifts the code sequence according to the control signal outputted from the bit shift control circuit 141. The code of a predetermined bit length, which is obtained by the shifting, is outputted as a partial code sequence.

To return to FIG. 4, the parallel-series conversion unit 150 outputs in series, by one bit at a time, to an external point, the partial code sequence outputted by the partial code sequence extraction unit 140, according to the clock signal supplied by the clock generation unit 160. Here, as an example, as FIG. 5 shows, the parallel-series conversion unit 150 includes a latch 151, a shift register 152, and a reset signal generation circuit 153.

The latch 151 temporarily holds the partial code sequence outputted by the partial code sequence extraction unit 140, and outputs the temporarily held partial code sequence according to the clock signal supplied by a divider 162 in the clock generation unit 160.

The shift register 152 holds the partial code sequence outputted by the latch 151. The shift register 152 outputs the held partial code sequence by shifting, by one bit at a time, according to the clock signal supplied by the clock generation unit 160. In addition, the partial code sequence held by the shift register 152 is updated with the partial code sequence held by the latch 151, according to the reset signal outputted from the reset signal generation circuit 153.

The reset signal generation circuit 153 generates a reset signal on a predetermined cycle, according to the clock signal supplied by the clock generation unit 160. The generated reset signal is outputted to the shift register 152.

Note that the partial code sequence outputted by the partial code sequence extraction unit 140 may be directly inputted into the shift register 152, through adjustments of the timing of code-sequence output at the timing control unit 130.

To return to FIG. 4, the clock generation unit 160 generates a clock signal of a first frequency. The clock generation unit 160 drives the parallel-series conversion unit 150 by supplying the generated clock signal to the parallel-series conversion unit 150. Here, as an example, as FIG. 5 shows, the clock generation unit 160 includes: a voltage control oscillator (VCO) 161, the divider 162, a phase frequency detector (PFD) 163, and a loop filter (LPF) 164.

Note that in the code generation apparatus 101, low-speed operational units such as the address control unit 110, the code table storage unit 120, the timing control unit 130, and the partial code sequence extraction unit 140 may be integrated, using an element made of Si material. In addition, such high-speed operational units as the parallel-series conversion unit 150 and the clock generation unit 160 may be integrated, using GaAs material, InP material, SiGe material, GaN material, and so on which allow high-speed operations. With this, further improvements in performance can be expected, and mounting to a single piece of board is facilitated, thereby making price reduction possible.

Next, the code table (the plurality of code sequences) stored in the code table storage unit 120 shall be described.

Figure 6:
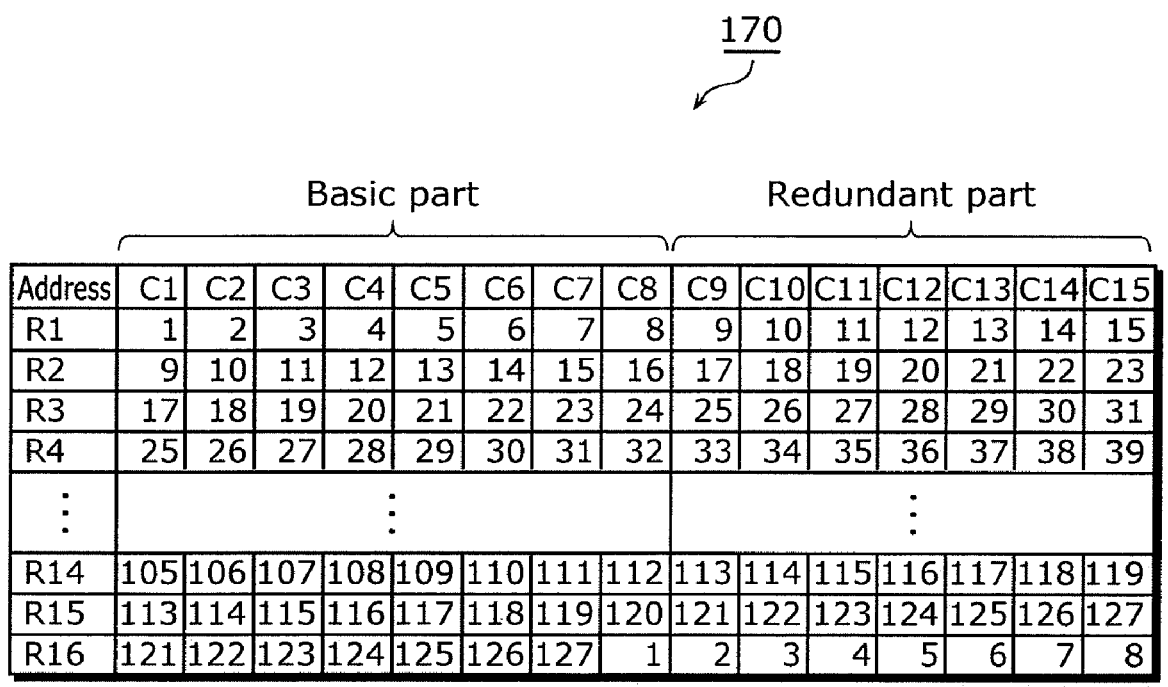
FIG. 6 is a diagram showing an exemplary code table stored in the code table storage unit in the first embodiment of the present invention.

FIG. 6 is a diagram showing an exemplary code table stored in the code table storage unit 120 in the present embodiment. As FIG. 6 shows, as an example here, the cycle of the M-sequence code is assumed as 127 ($2^n-1$: n=7). The width of the data bus at the output side of the partial code sequence extraction unit 140 is assumed as 8 bits. An 8-bit partial code sequence is assumed to be outputted by the partial code sequence extraction unit 140. In this case, the code table 170 includes a record in which code sequences are registered each corresponding to each of the addresses from address R1 to R16. A code sequence is composed of a basic part made up of higher-order 8 bits (C1 to C8) and a redundant part made up of lower-order 7 bits (C9 to C15). The redundant part is equivalent to a higher-order 7-bit code sequence in the basic part (C1 to C8) at the subsequent address.

Here, instead of actual codes (binary data), the code sequence is represented by non-overlapping numbers from 1 to 127 each corresponding to each code.

For example, in a storage area for address R1, codes from "1" to "15" are sequentially stored at C1 to C15. In the storage area for address R2, codes from "9" to "23" are sequentially stored at C1 to C15. Here, since the M-sequence code (code cycle: $2^7-1=127$) is used as the pseudo-noise code, the basic part of a storage area for address R16 has a 1-bit vacancy. Thus, starting from a bit part having a vacancy, the codes are sequentially stored again, starting with code "1".

In other words, assuming that the width of the data bus at the output side of the partial code sequence extraction unit 140 is X-bit (X is an integer that is 1 or larger), the code table storage unit 120 has a continuous storage area of at least 2X-1 bit with respect to each address. A 2X-1 bit code sequence is stored in each of the storage area. Each code sequence is composed of a basic part made up of higher-order X bits and a redundant part made up of lower-order X-1 bits. The redundant part is identical to a higher-order X-1 bit code of the basic part at the subsequent address.

Note that a vacancy is also generated when a Gold-sequence code is used instead of the M-sequence code, and therefore the vacancy is filled in the same manner. In addition, the codes may be continuously stored in a part succeeding the 2X-1 bit. In this case, data different from codes may be stored. That is, the data other than codes may be stored higher or lower in the 2X-1 bit code. In addition, here, the codes are serially stored, starting from the highest bit C1 to the lowest bit C15, but the codes may also be sequentially stored, starting from the lowest bit C15 to the highest bit C1. In other words, code "1" is stored at R1: C15, and code "2" is stored at R1: C14, and finally code "15" is stored at R1: C1. Subsequently, the codes may also be stored in a reversal order; for example, code "9" may be stored at R2: C15. Furthermore, as FIG. 6 shows, the code sequence may be stored in random order at C1 to C15, and may also be outputted, after an operation is performed so that continuous codes make up the code sequence to be inputted into the partial code sequence extraction unit 140.

Note that in each storage area, plural types of code sequences may be stored, instead of having one kind of code sequence stored (See FIG. 7, for example). In this case, each code sequence is stored in a continuous storage area of at least 2X-1 bit.

FIG. 7 is a diagram showing an exemplary variation of a code table stored in the code table storage unit 120 in the present embodiment. As FIG. 7 shows, as an example of the variation, the code table 180 includes a record in which two types of code sequences are stored with respect to each of the addresses from R1 to R16. Hereinafter, of the two types of code sequences, one is referred to as a first code sequence part, and the other is referred to as a second code sequence part. The first code sequence part is composed of a basic part made up of higher-order 8 bits (C1 to C8) and a redundant part made up of lower-order 7 bits (C9 to C15). The redundant part (C9 to C15) is identical to a higher-order 7-bit code sequence (C1 to C8) of the basic part at the subsequent address. The second code sequence part is composed of a basic part made up of higher-order 8 bits (C16 to C23) and a redundant part made up of lower-order 7 bits (C24 to C30). The redundant part (C24 to C30) is identical to a higher-order 7-bit code sequence (C16 to C23) of the basic part at the subsequent address.

Next, input and output performed by the partial code sequence extraction unit 140 of the present embodiment shall be described.

Figure 8:
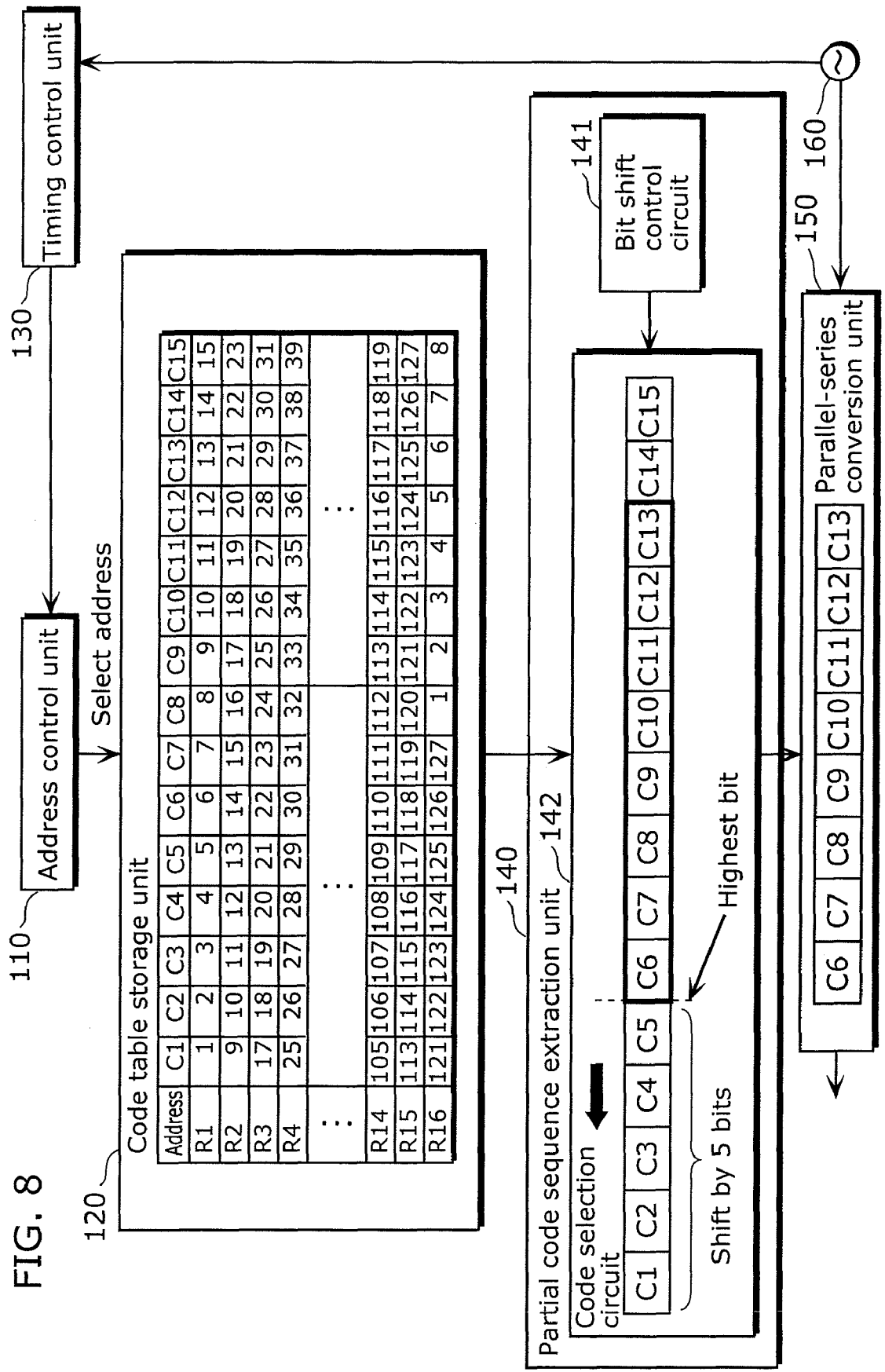
FIG. 8 is a diagram showing input and output IO performed by a partial code sequence extraction unit in the first embodiment of the present invention.

FIG. 8 is a diagram showing input and output performed by a partial code sequence extraction unit 140 in the present embodiment. As FIG. 8 shows, here, the case where the code sequence is shifted by 5 bits at the partial code sequence extraction unit 140 shall be described as an example.

First, the address control unit 110 outputs an address for identifying the code sequence to be read, to the code table storage unit 120. When the address is outputted by the address control unit 110, the code table storage unit 120 outputs a code sequence (C1 to C15) that is identified by the address.

According to this, the partial code sequence extraction unit 140 shifts, by 5 bits, the code sequence (C1 to C15) that is outputted by the code table storage unit 120. An 8-bit code (C6 to C13) starting with the highest bit is outputted as a partial code sequence. At this time, the bit shift control circuit 141 outputs, to the code selection circuit 142, a control signal for shifting the code sequence by 5 bits. The code selection circuit 142 shifts, by 5 bits, the code sequence outputted by the code table storage unit 120, according to the control signal outputted by the bit shift control circuit 141.

Note that in the case where the code table 180 shown in FIG. 7 is used in place of the code table 170, it is possible to select an 8-bit code from a different type of code sequence by increasing the amount of bits by which the code sequence is shifted. With this, it is possible to quickly change the code pattern when interference or the like occurs.

Figure 9:
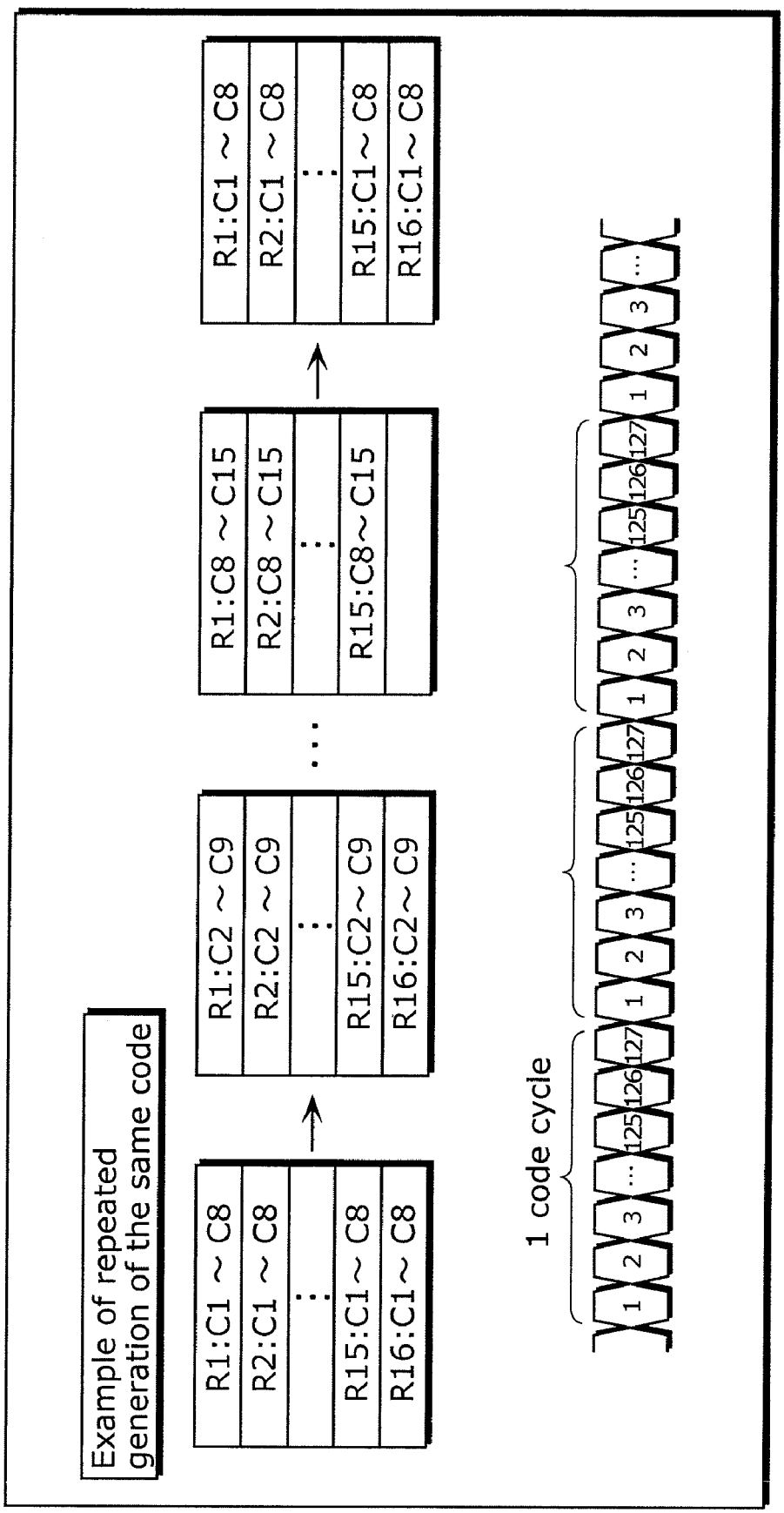
FIG. 9 is a diagram showing an overview of the case where the same code is repeatedly generated by the code generating apparatus in the first embodiment of the present invention.
Figure 10:
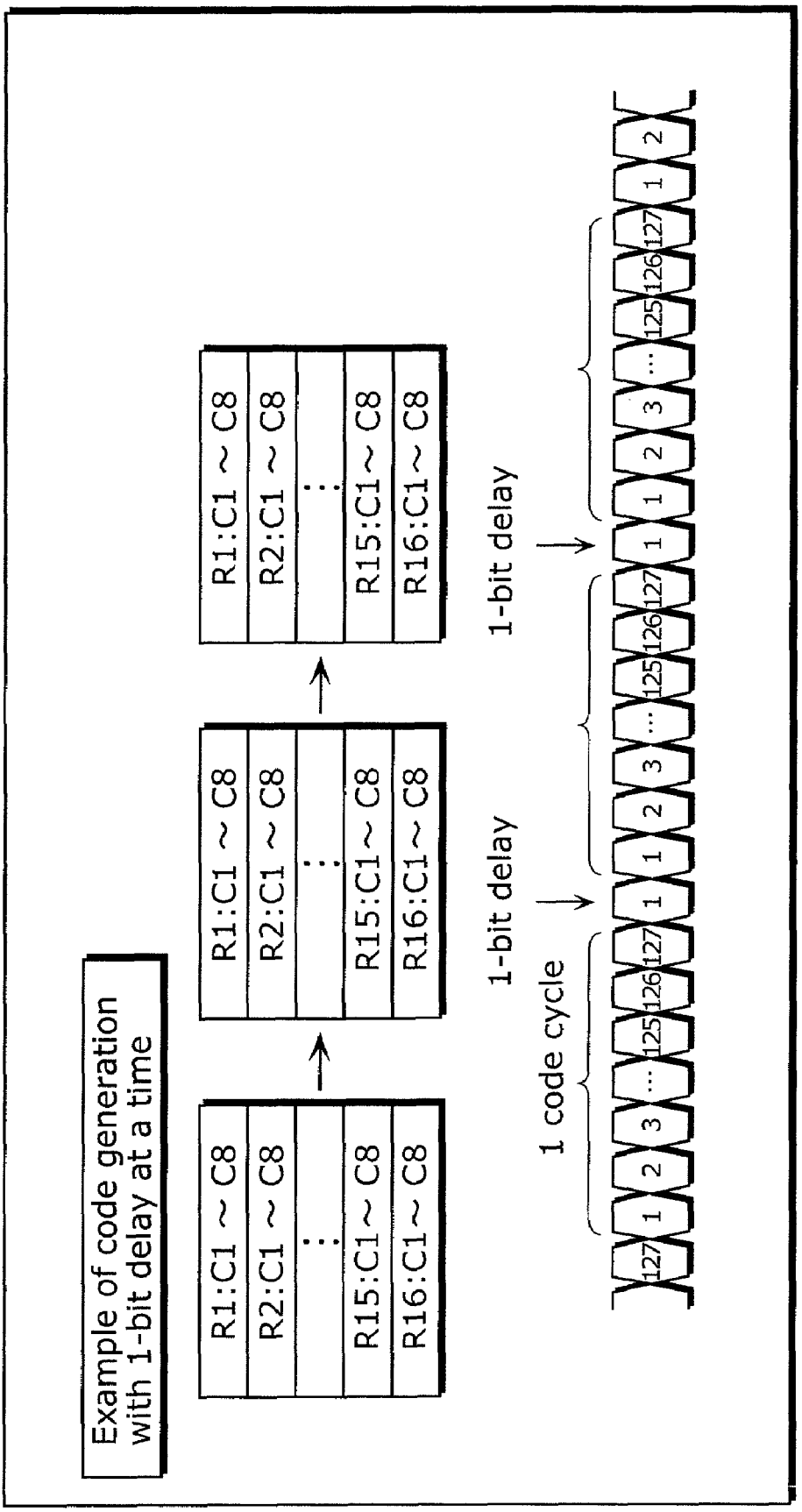
FIG. 10 is a diagram showing an overview of the case where a code having a 1-bit delay is generated by the code generating apparatus in the first embodiment of the present invention.
Figure 11:
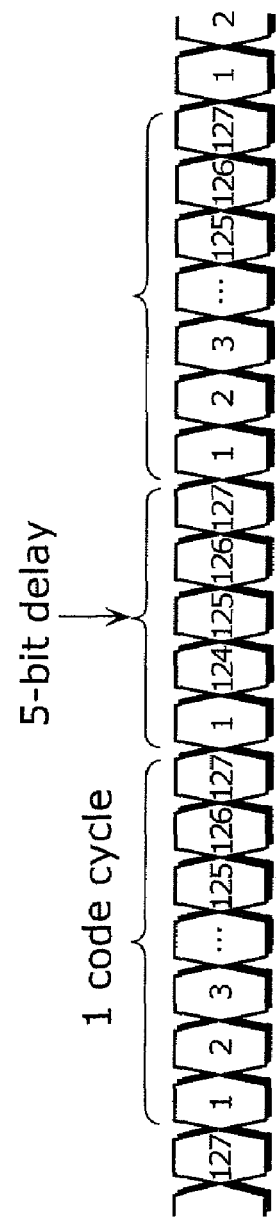
FIG. 11 is a diagram showing an overview of the case where a code having a 5-bit delay is generated by the code generating apparatus in the first embodiment of the present invention.

FIGS. 9, 10, and 11 are diagrams showing the overview of a partial code sequence outputted by the partial code sequence extraction unit 140 in the present embodiment, and of codes outputted in series, by one bit at a time, by the parallel-series conversion unit 150. Hereinafter, of a code sequence (Rn: C1 to C15) corresponding to address Rn (n is an integer from 1 to 16), a higher-order 8-bit code starting with a bit shifted lower from the highest bit by m bit (m is an integer from 0 to 7) is assumed as a partial code sequence (Rn: C1+m to C8+m).

Here, as an example as shown in FIG. 9, the case where the same code is repeatedly caused to be generated shall be described. First, the partial code sequence extraction unit 140 outputs, as a partial code sequence (R1: C1 to C8), a higher-order 8-bit code to be read, from the code sequence (R1: C1 to C15) outputted by the code table storage unit 120. Along with this, the parallel-series conversion unit 150 outputs, by one bit at a time, the partial code sequence (R1: C1 to C8) outputted by the partial code sequence extraction unit 140. At this time, codes from "1" to "8" are sequentially outputted in series by one bit at a time.

Then, the partial code sequence extraction unit 140 performs the same process on code sequences from (R2: C1 to C15) to (R16: C1 to C15) that are outputted by the code table storage unit 120. Along with this, the parallel-series conversion unit 150 performs the same process on partial code sequences from (R2: C1 to C8) to (R16: C1 to C8) outputted by the partial code sequence extraction unit 140.

However, the parallel-series conversion unit 150 sequentially outputs codes from "121" to "127" with respect to the partial code sequence (R16: C1 to C8). Then, returning to the first code, the parallel-series conversion unit 150 outputs code "1". In using the M-sequence code like this, since 1-bit vacancy is generated, the codes are outputted with a delay of one bit. Therefore, the partial code sequence extraction unit 140 subsequently needs to output a partial code sequence (R1: C2 to C9) starting with code "2".

Thus, the partial code sequence extraction unit 140 shifts lower by one bit, a higher-order 8-bit code to be read, from the code sequence (R1: C1 to C15) outputted by the code table storage unit 120. Along with this, the parallel-series conversion unit 150 outputs, by one bit at a time, the partial code sequence (R1: C2 to C9) outputted by the partial code sequence extraction unit 140. At this time, codes from "2" to "9" are sequentially outputted in series by one bit at a time.

Then, the parallel-series conversion unit 150 performs the same process on partial code sequences (R2: C2 to C9) to (R16: C2 to C9) that are outputted by the partial code sequence extraction unit 140.

Likewise, the partial code sequence extraction unit 140 shifts lower by 2 bits, a higher-order 8-bit code to be read, from the code sequence (R1: C1 to C15) outputted by the code table storage unit 120. The higher-order 8-bit code shifted lower by 2 bits is outputted as a partial code sequence (R1: C3 to C10). Along with this, the parallel-series conversion unit 150 outputs, by one bit at a time, the partial code sequence (R1: C3 to C10) outputted by the partial code sequence extraction unit 140. At this time, codes from "3" to "10" are sequentially outputted in series by one bit at a time.

Then, the parallel-series conversion unit 150 performs the same process on partial code sequences from (R2: C3 to C10) to (R16: C3 to C10) that are outputted by the partial code sequence extraction unit 140.

Subsequently, the partial code sequence extraction unit 140 outputs a higher-order 8-bit code to be read, from the code sequence (Rn: C1 to C15) outputted by the code table storage unit 120, by shifting the code lower, by one bit at a time, each time the process is performed on the code sequences from addresses from R1 to R16. Finally, the code sequence to be read is shifted lower by 7 bits, and the partial code sequence extraction unit 140 outputs partial code sequences from (R1: C8 to C15) to (R15: C8 to C15), to return to the initial partial code sequence (R1: C1 to C8).

Next, as FIG. 10 shows, the case of generating a code delayed by one bit shall be described. In this case, each time the partial code sequence extraction unit 140 performs the process on code sequences at address R1 to R16, the partial code sequence extraction unit 140 operates as follows. The partial code sequence 10 extraction unit 140 outputs, without shifting, a higher-order 8-bit code to be read from the code sequence (Rn: C1 to C15) that is outputted by the code table storage unit 120, instead of shifting lower, by one bit at a time, the higher-order 8-bit code to be read from the code sequence. By doing so, it is possible to generate a code delayed by 1 bit, and to utilize the code for the correlation operation in the spread spectrum scheme.

In addition, as FIG. 11 shows, it is assumed that the code delayed by 5 bits is generated. In this case, each time the process is performed on the code sequences at address R1 to R16, the partial code sequence extraction unit 140 operates as follows.

First, the partial code sequence extraction unit 140 outputs a higher-order 8-bit code to be read as a partial code sequence (Rn: C1 to C8), from a code sequence at address R1 to R16 (Rn: C1 to C15). Next, the partial code sequence extraction unit 140 shifts lower by 3 bits, a higher-order 8-bit code to be read from the code sequence at address R16 (R16: C1 to C15). The higher-order 8-bit code shifted lower by 3 bits is outputted as a partial code sequence (R16: C4 to C11). With this, after codes "1" to "127" of the first cycle are outputted, code "1" and codes from "124" to "127" corresponding to the 5-bit delay and codes from "1" to "4" of the second cycle are outputted.

Subsequently, the partial code sequence extraction unit 140 shifts lower, by 4 bits at a time, the higher-order 8-bit code sequence (Rn: C1 to C15) to be read at address R1 to R16. The higher-order 8-bit code shifted lower by 4 bits is outputted as a partial code sequence (Rn: C5 to C12). Subsequently, returning to the start, the partial code sequence extraction unit 140 outputs again, a higher-order 8-bit code to be read as a partial code sequence (Rn: C1 to C8), from each code sequence at address R1 to R16 (Rn: C1 to C15). With this, after codes "5" to "127" of the second cycle are outputted, codes from "1" to "5" corresponding to the 5-bit delay are outputted.

After this, likewise, in generating a code delayed by an arbitrary bit length, the partial code sequence extraction unit 140 shifts the bits lower as appropriate, each time the process is performed on each code sequence at address R1 to R16.

Subsequently, a timing chart of the code generation apparatus 101 in the present embodiment shall be described.

Figure 12:
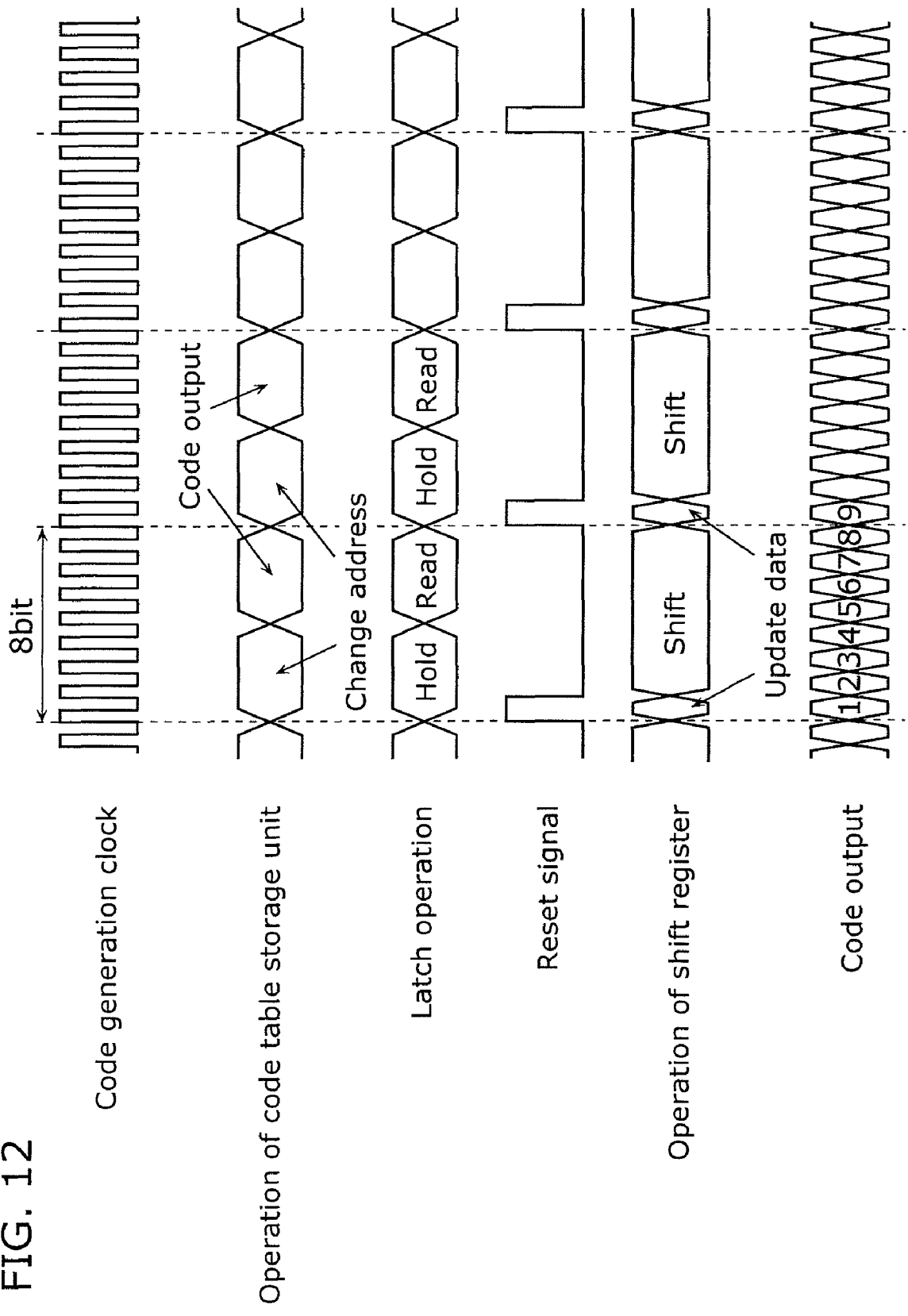
FIG. 12 shows a timing chart of the code generation apparatus in the first embodiment of the present invention.

FIG. 12 is a diagram showing the timing chart of the code generation apparatus 101 in the present embodiment. As FIGS. 12 and 5 show, the clock generation unit 160 supplies a clock signal to the parallel-series conversion unit 150, the timing control unit 130, and so on. Here, the clock signal is a clock signal that drives the shift register 152 in the parallel-series conversion unit 150. Note that it is necessary to cause the shift register 152 to operate with a frequency eight times higher than the frequency of the timing signal that controls the status of the code table storage unit 120, so as to cause the clock signal to output in series, by one bit at a time, an 8-bit partial code sequence that is outputted in parallel by the code table storage unit 120 through the partial code sequence extraction unit 140.

As shown by the operation of the code table storage unit 120, the code table storage unit 120 changes the address of the code sequence to be read, between each 8-clock clock signal (hereinafter, referred to as an address change operation), and outputs a code sequence identified by the address after change, concurrently with the period for reading performed by the latch 151 (hereinafter, referred to as a code output operation). Subsequently, with the address change operation and the code output operation being alternately repeated, addresses from R1 to R16 are outputted. Here, assuming that the address change operation is performed during a period when the timing signal outputted by the timing control unit 130 is "0", and that the code output operation is performed during a period when the timing signal is "1", it is understood that the clock frequency is eight times higher than the frequency of the timing signal.

The latch 151, as shown by the latch operation, updates a partial code sequence held by the latch 151, concurrently with the period of the code output operation by the code table storage unit 120 (hereinafter, referred to as a read operation), and holds the partial code sequence to be outputted to the shift register 152, concurrently with the period of the address change operation performed by the code table storage unit 120 (hereinafter, referred to as a holding operation).

The reset signal generation circuit 153 outputs a reset signal to the shift register 152 concurrently with the period of the holding operation by the latch 151, and changes the partial code sequence held by the shift register 152 into the partial code sequence held by the latch 151.

As shown by the operation of the shift register, when the reset signal "1" is inputted from the reset signal generation circuit 153, the shift register 152 updates the partial code sequence that it holds, with the partial code sequence held by the latch 151 (hereinafter, referred to as a data update operation). When a reset signal "0" is inputted from the reset signal generation circuit 153, the shift register 152 outputs, by shifting, the partial code sequence that it holds (hereinafter, referred to as a data shift operation). Then, as shown by the code output, codes are sequentially outputted according to the clock signal, and the data updated in the data update operation is outputted.

By thus controlling the timing of each constituent element according to the timing chart shown in FIG. 12, it is possible to generate a code having a high-speed chip rate. In other words, the codes stored in the code table storage unit 120 can be outputted only once with respect to the 8-clock clock signal supplied by the clock generation unit 160. However, since an 8-bit code is inputted in parallel into the parallel-series conversion unit 150, it becomes possible to output the code at a high-speed chip rate (eight times higher than the timing signal) by outputting the partial code sequence in series, by one bit at a time, by the parallel-series conversion unit 150.

Thus far, according to the code generation unit 101 in the present embodiment, it is possible to store a plurality of code sequences in the code table storage unit 120, and to generate a pseudo-noise code having an arbitrary code length and an arbitrary amount of delay, by causing the code sequences to be stored according to a predetermined rule. With this, it becomes possible to provide a code generation apparatus which has high interference resistance and dramatically-improved degrees of freedom in correlation operation. In addition, as for codes other than the M-sequence code, it is also possible, by using the code sequence in the same manner, to reduce the amount of address control operation and achieve high read efficiency.

In addition, it is possible to output in series, by one bit at a time, codes that are outputted in parallel by the code table storage unit 120, by using the code table storage unit 120 and the parallel-series conversion unit 105 operating with a high-speed clock frequency, thereby allowing provision of a spread spectrum radar apparatus having a high resolution.

Note that the operation clock of the latch 151 in FIG. 5 is directly inputted by the divider 162, but a clock signal controlled by the timing control unit 130 may also be used. In addition, the clock generation unit 160 may be exclusively made up of a stable voltage control oscillator (VCO) 161 and the divider 162.

Note that as FIG. 6 shows, the code sequence may not necessarily be sequentially arranged according to each address. For example, a code sequence, which should be stored at address R1, may be stored at address R4 or the like. Furthermore, the storing order of the code sequences may be reversal, or may be at random within an address. It goes without saying that the case necessitates operations for address control and code order adjustments.

Note that data different from the code sequence or a vacant bit may be present preceding or succeeding the code sequence, or between the code sequence and a different type of code sequence. In addition, for storing two types of code sequences, a second code sequence part may be stored at an address different from an address at which a first code sequence part is stored.

Note that the plurality of code sequences to be stored in the code table storage unit 120 may be stored at arbitrary addresses, and a code may be outputted by specifying an intended address. However, for efficient readout, it is preferable to store such a plurality of code sequences, as performed by the code table storage unit 120 in the present embodiment.

Note that it is also possible to skip the latch 151 of the parallel-series conversion unit 150, by causing the timing control unit 130 to adjust the operation of the code table storage unit 120 so that the code output operation of the code table storage unit 120 is concurrently performed along with the data update operation of the shift register 152. However, it is preferable, as the present embodiment shows, to include the latch 151 since errors in the code output can be reduced.

Second Embodiment

Hereinafter, a second embodiment of the present invention shall be described with reference to the drawings.

A code generation apparatus according to the present embodiment includes characteristics shown in (e) below.

(e) A partial code sequence extraction function includes: (e1) a first partial code sequence extraction function to read a first code sequence part from a code sequence selected by a code sequence selection function, and to extract a code of a predetermined bit length from the first code sequence part; (e2) a second partial code sequence extraction function to read a second code sequence part from the code sequence selected by the code sequence selection function, and to extract a code of a predetermined bit length from the second code sequence part; (e3) a partial code sequence selection function to alternately select the first partial code sequence extraction function and the second partial code sequence extraction function, and to output, as a partial code sequence, the code of a predetermined bit length extracted by the selected one of the partial code sequence selection functions.

Based on the above point, the code generation apparatus in the present embodiment shall be described. Note that the same numerical references shall be assigned to the constituent elements described in the first embodiment, and therefore the description thereof shall be omitted.

Figure 13:
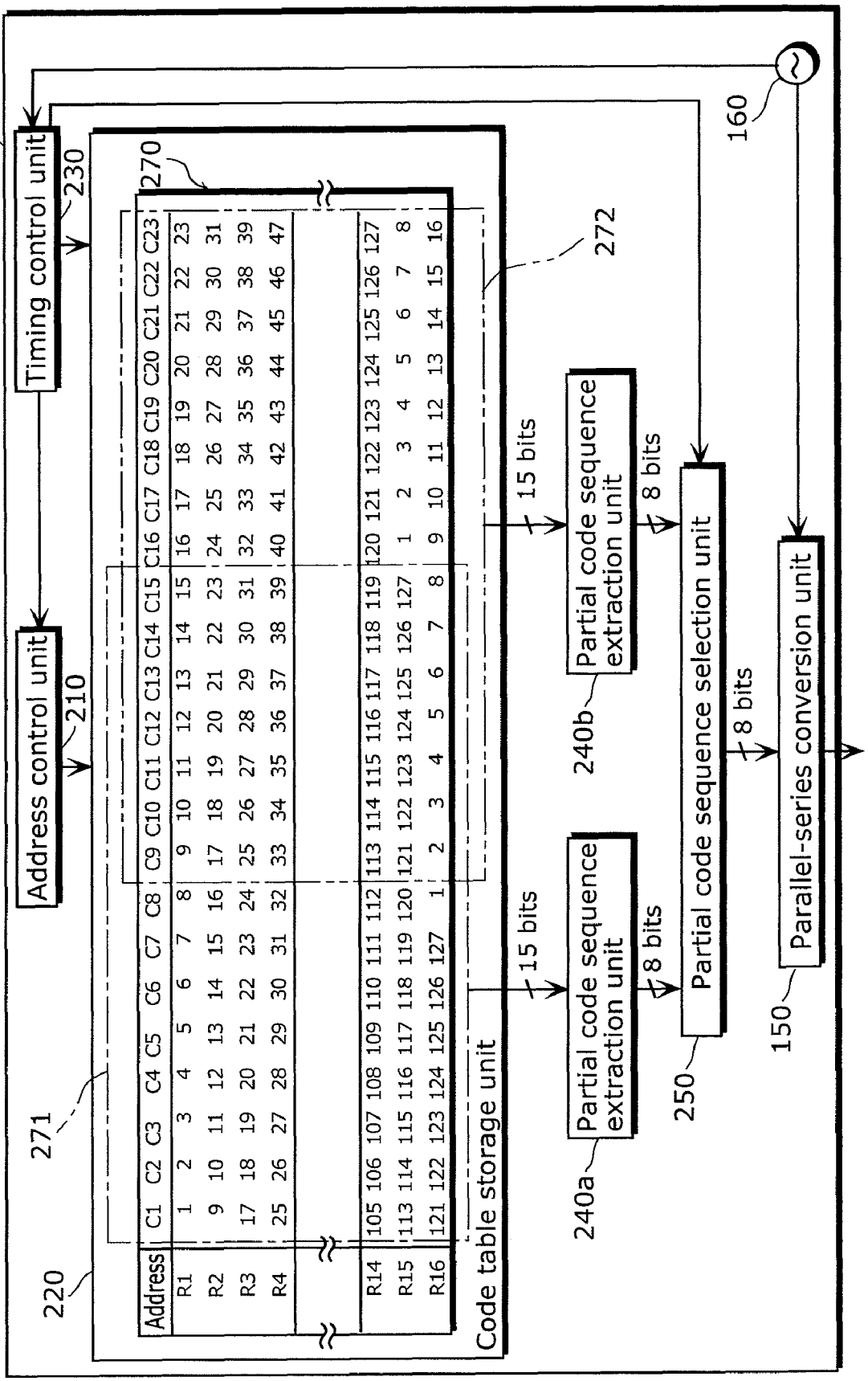
FIG. 13 is a diagram showing the structure of a code generation apparatus in a second embodiment of the present invention.

FIG. 13 is a diagram showing the structure of the code generation apparatus in the present embodiment. As FIG. 13 shows, a code generation apparatus 201 differs from the code generation apparatus 101 in the first embodiment shown in FIG. 4 in the following points. In the code generation apparatus 201, two types of code sequences are outputted from a code table storage unit 220 according to the timing signal supplied by the timing control unit 230, and are alternately selected by a partial code sequence selection unit 250, so as to be outputted. At the time, the partial code sequence selection unit 250 alternately outputs the two types of partial code sequences with a frequency twice as high as that of the timing signal.

Specifically, a code table 207 is assumed as stored in the code table storage unit 220. In the code table 270, a 23-bit code sequence (C1 to C23) is stored according to each of the addresses from R1 to R16. In the code table 270, a part corresponding to addresses from R1 to R16 and bits C1 to C15 is assumed as area 271. A part corresponding to the addresses from R1 to R16 and the bits C9 to C23 is assumed as area 272. In other words, assuming that the data-bus width at the output side of the partial code sequence selection unit 250 is Y (Y is an integer that is 1 or larger), each of the addresses from R1 to R16 is made up of 3Y−1 bit data, with higher-order Y bits corresponding to a basic part, and with a higher-order Y+1 bit and a part succeeding the bit corresponding to a redundant part. In addition, area 271 is made up of a basic part corresponding to the higher-order Y bits and a redundant part corresponding to a part from the Y+1 bit to a 2Y−1 bit. Area 272 is present subsequent to the Y+1 bit in the redundant part, with a basic part corresponding to the higher-order Y+1 bit to a 2Y bit, and a redundant part corresponding to a 2Y+1 bit to a 3Y−1 bit. Here, the case where 8 is adopted for Y shall be described.

In this case, the address control unit 210 selects bits C1 to C23 at address R1. Accordingly, a partial code sequence extraction unit 240a reads a first partial code sequence (bits C1 to C15 at address R1) from the code sequence (bits C1 to C23 at address R1) selected by the address control unit 210, and extracts an 8-bit code from the first partial code sequence (bits C1 to C15 at address R1). In addition, a partial code sequence extraction unit 240b reads a second partial code sequence (bits C9 to C23 at address R1) from the code sequence (bits C1 to 23 at address R1), and extracts an 8-bit code from the second partial code sequence (bits C9 to C23 at address R1). Then, the partial code sequence selection unit 250 alternately selects the partial code sequence extraction unit 240a and the partial code sequence extraction unit 240b, and outputs, as a partial code sequence, a code of a predetermined bit length that is extracted by the selected one of the partial code sequence extraction units. Note that the partial code sequence extraction units 240a and 240b are the same constituent elements as the partial code sequence extraction unit 140 in the first embodiment except that the partial code sequence extraction units 240a and 240b collaborate, respectively, in bit shift control circuits in which they are included, and therefore the description thereof shall be omitted. In addition, in such collaboration, the collaboration may be synchronous or asynchronous. Furthermore, the shift amount may be the same or different.

Figure 14:
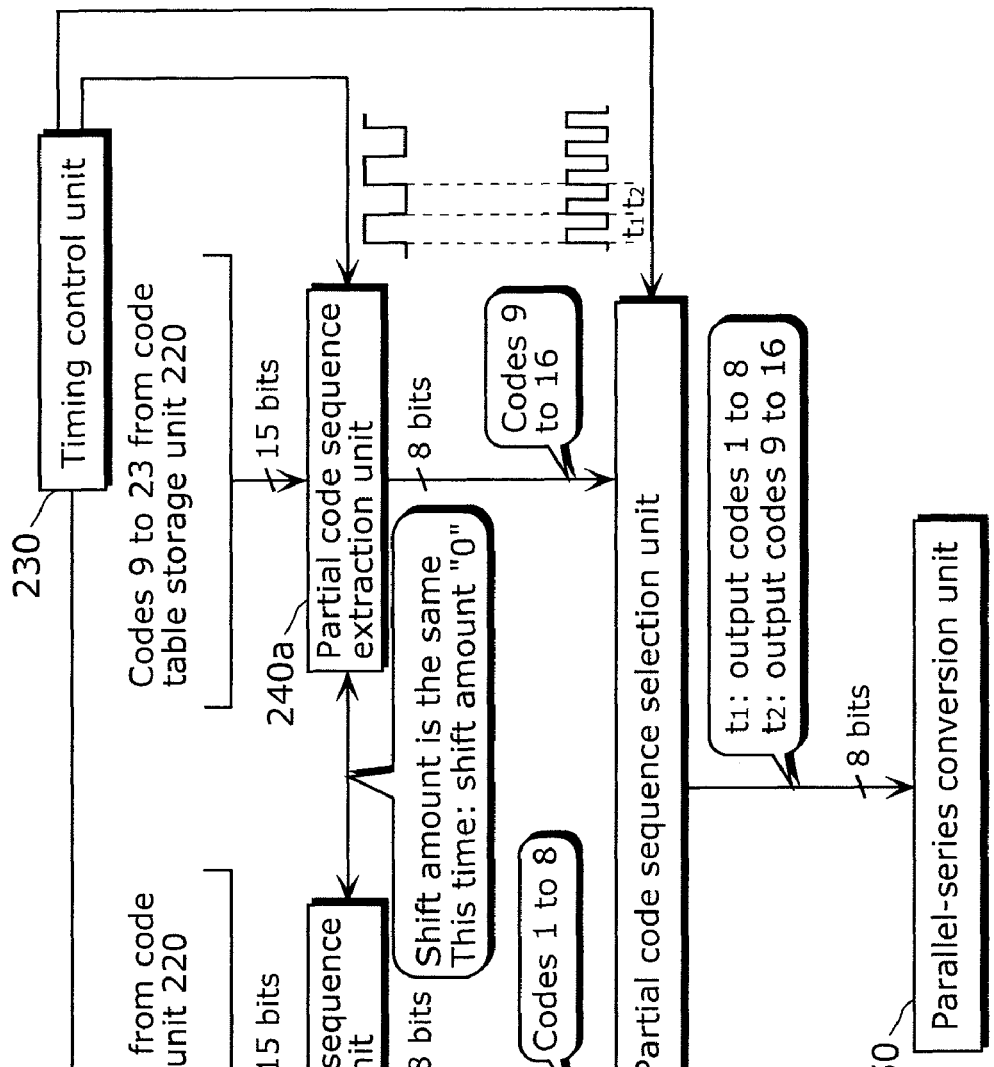
FIG. 14 is a diagram showing an overview of the case where the same code is repeatedly generated by the code generating apparatus in the second embodiment of the present invention.

For example, in the case where the shift amount is "0", as FIG. 14 shows, the partial code sequence extraction unit 240a selects a partial code sequence (bits C1 to C8 at address R1) from the first partial code sequence (bits C1 to C15 at address R1), and outputs the selected partial code sequence to the partial code sequence selection unit 250. In addition, the partial code sequence extraction unit 240b selects a partial code sequence (bits C9 to C23 at address R1) from the second partial code sequence (bits C9 to C16 at address R1), and outputs the selected partial code sequence to the partial code sequence selection unit 250. Then, the partial code sequence selection unit 250 outputs a partial code sequence (bits C1 to C8 at address R1) to a parallel-series conversion unit 150 at the leading edge of the timing signal (time $t_1$). At the trailing edge of the timing signal (time $t_2$), the partial code sequence (bits C9 to C16 at address R1) is outputted to the parallel-series conversion unit 150.

Figure 15:
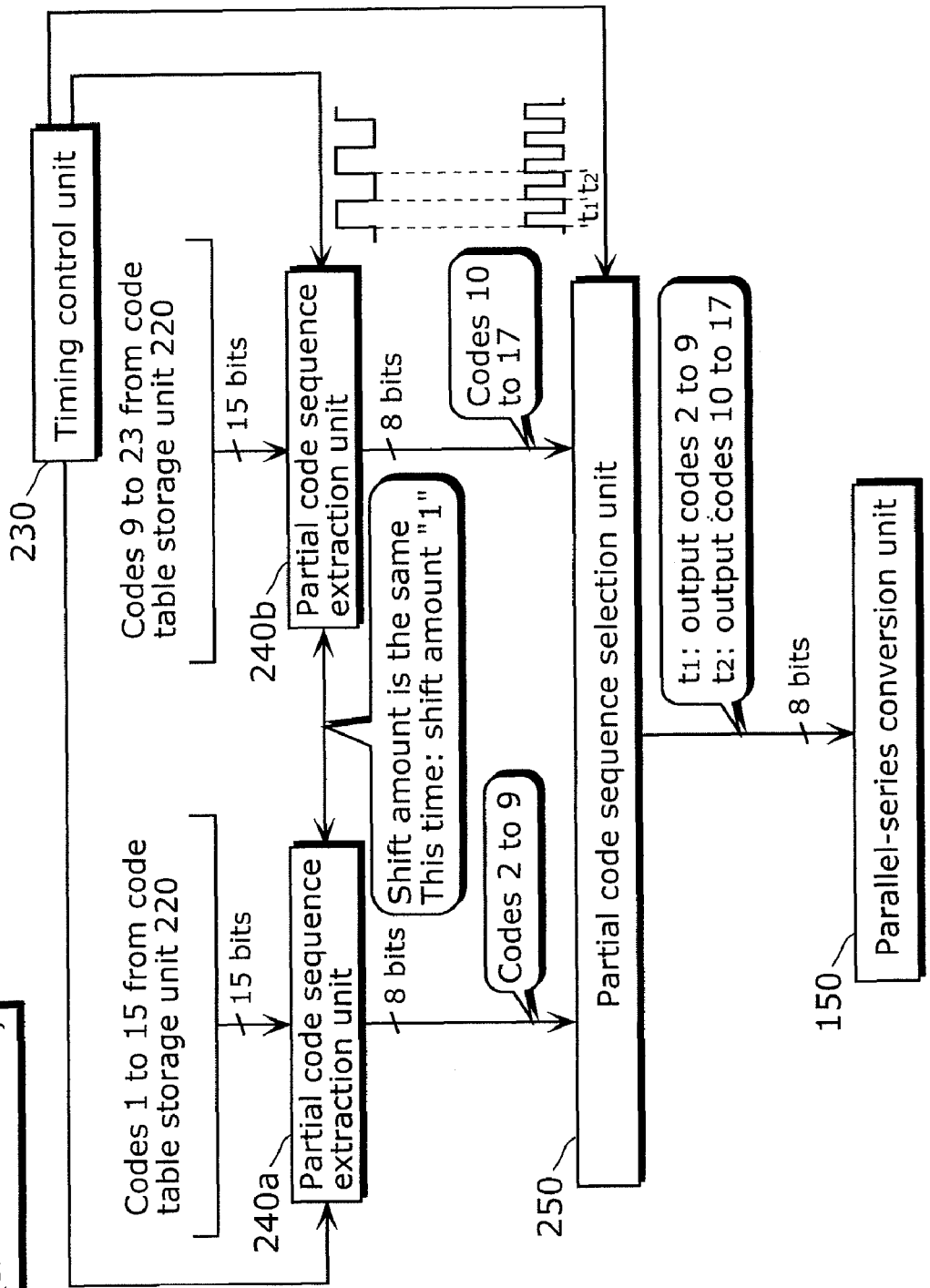
FIG. 15 is a diagram showing an overview of the case where a code having a 1-bit delay is generated by the code generating apparatus in the second embodiment of the present invention.

Likewise, in the case where the shift amount is "1", as FIG. 15 shows, the partial code sequence extraction unit 240a selects a partial code sequence (bits C2 to C9 at address R1) from the code sequence (bits C1 to C15 at address R1), and outputs the selected partial code sequence to the partial code sequence 10 selection unit 250. In addition, the partial code sequence extraction unit 240b selects a partial code sequence (bits C10 to C17 at address R1) from a code sequence (bits C9 to C23 at address R1), and outputs the selected code sequence to the partial code sequence selection unit 250. Then, the partial code sequence selection unit 250 outputs a partial code sequence (bits C2 to C9 at address R1) to the parallel-series conversion unit 150 at the leading edge of the timing signal (time $t_1$). At the trailing edge of the timing signal (time $t_2$), the partial code sequence (bits C10 to C17 at address R1) is outputted to the parallel-series conversion unit 150.

Then, the address control unit 210 selects bits C1 to C23 at address R3 by skipping one address. The same processing is performed by the partial code sequence extraction unit 240a, the partial code sequence extraction unit 240b, and the partial code sequence selection unit 250.

With this, the code generation apparatus 201 can continue providing partial code sequences to the parallel-series conversion unit 150 without interruption.

For example, there is a case where the code generation apparatus 101 cannot keep up with the provision of the partial code sequences to the parallel-series conversion unit 150. This is because the code table storage unit 120 and the partial code sequence extraction unit 140 are caused to operate at low speed when required to perform a large amount of operation. In contrast, the code generation apparatus 201 prepares and alternately outputs continuous partial code sequences. This allows the code table storage unit 220, the partial code sequence extraction unit 240a, the partial code sequence extraction unit 240b, and so on to operate with a frequency half as high as a frequency at which the code table storage unit 120, the partial code sequence extraction unit 140, and so on operate. Furthermore, the partial code sequence selection unit 250 is only required to select which partial code sequence to output, and can therefore operate at high speed as compared to the code table storage unit 220, the partial code sequence extraction unit 240a, the partial code sequence extraction unit 240b, and so on. As a result, the code generation apparatus 201 can continue providing partial code sequences to the parallel-series conversion unit 150 without interruption.

Third Embodiment

Hereinafter, a third embodiment of the present invention shall be described with reference to the drawings.

The code generation apparatus according to the present embodiment includes characteristics shown in (f) below.

(f) The code generation apparatus includes: (f1) a code generation function to generate a pseudo-noise code; (f2) a code holding function to hold a 2X-1 bit code from the code generated by the code generating function; (f3) a write control function to cause: initially, the 2X-1 bit code from the code held by the code holding function to be stored in a predetermined storage destination in the storage function, when the 2X-1 bit code is held by the code holding function; and, subsequently, a 2X-1 bit code newly held by the code holding function to be stored in a new storage destination in the storage function, when a new X-bit code is held by the code holding function.

Based on the above point, the code generation apparatus in the present embodiment shall be described. Note that the same numerical references shall be assigned to the constituent elements described in the first embodiment, and therefore the description thereof shall be omitted.

Figure 16:
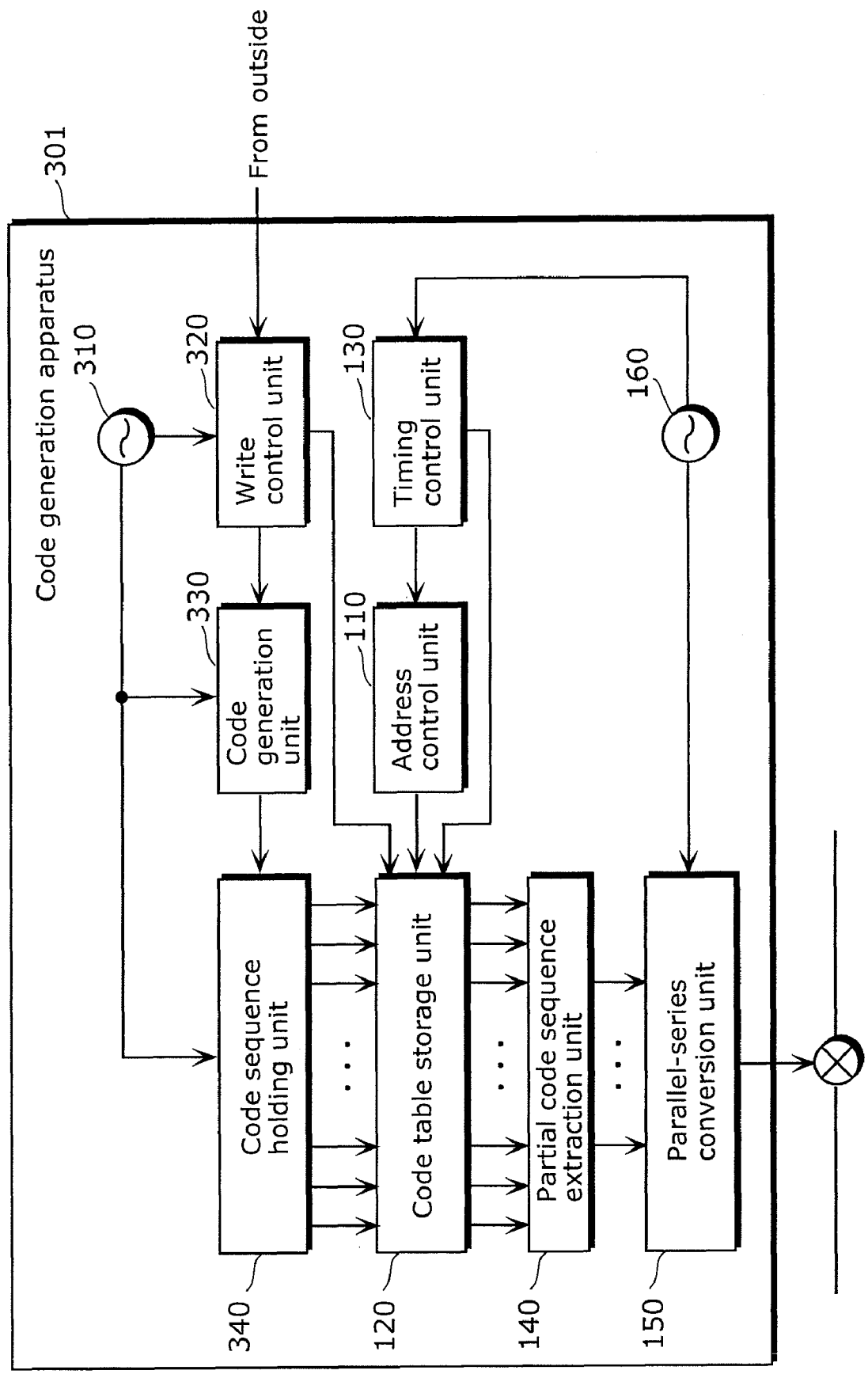
FIG. 16 is a diagram showing the structure of a code generation apparatus in a third embodiment of the present invention.

FIG. 16 is a diagram showing the structure of the code generation apparatus in the present embodiment. As FIG. 16 shows, the code generation apparatus 301 further includes: a clock signal supply unit 310, a write control unit 320, a code generation unit 330, and a code sequence holding unit 340. A clock signal is supplied by the clock signal supply unit 310 to each of the write control unit 320, the code generation unit 330, and the code sequence holding unit 340.

Figure 17:
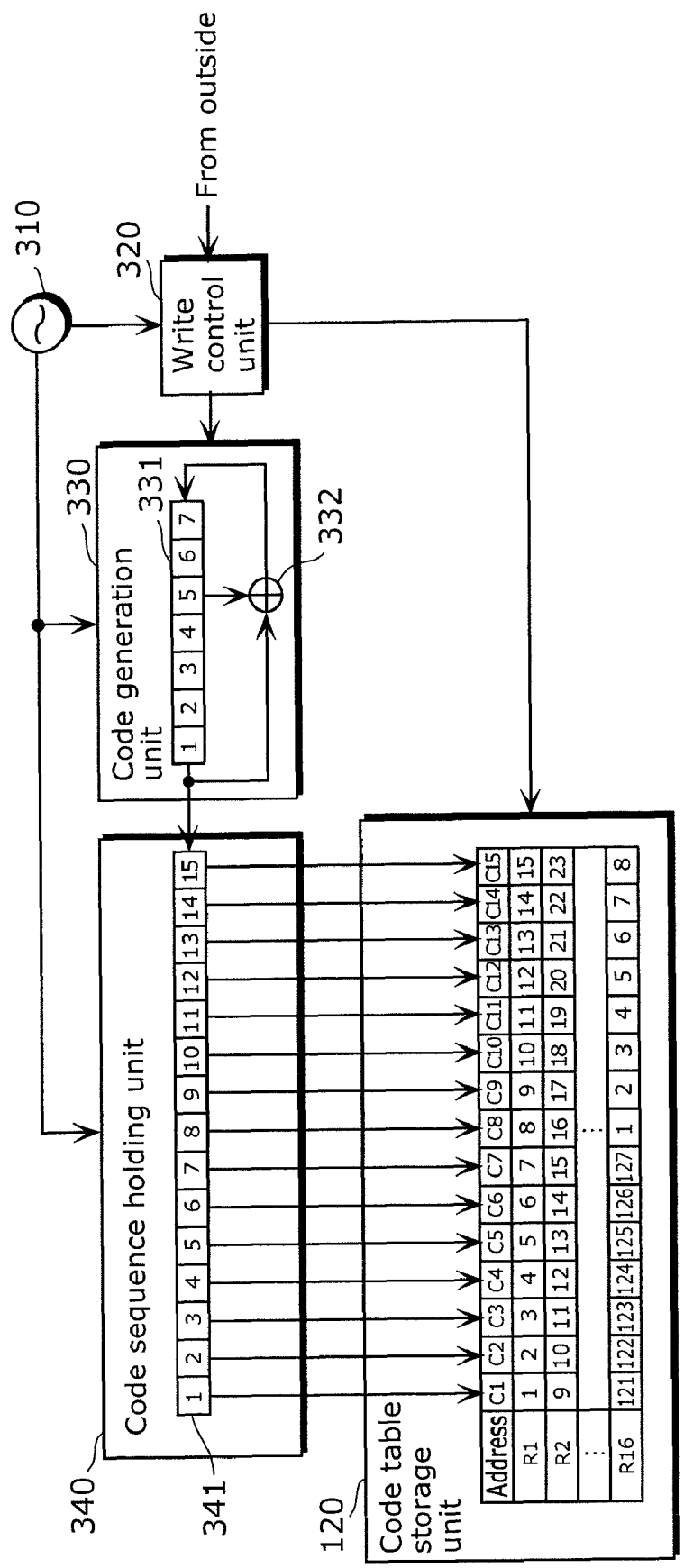
FIG. 17 is a diagram showing the detailed structure of a code generation apparatus in the third embodiment of the present invention.

FIG. 17 is a diagram showing the structure of the code generation apparatus in the present embodiment. As FIG. 17 shows, it is assumed that in the code generation apparatus 301, a control signal for generating a code serving as a source for a pseudo-noise code is provided to the write control unit 302 through an input terminal (not shown) from the outside. In this case, according to the clock signal supplied by the clock signal supply unit 310, the write control unit 320, the code generation unit 330, and the code sequence holding unit 340 operate as follows.

The write control unit 320 causes the code generation unit 330 to generate a code. Accordingly, the code generation unit 330 generates the code according to the clock signal supplied by the clock signal supply unit 310, by using a shift register 331 and an exclusive OR operation circuit (EX-OR) 332, and outputs the generated code. Here, the code generation unit 330 is represented by a PN code generator using the shift register shown in FIG. 1, and the shift register 331 is, for example, a seven-staged shift register.

The code sequence holding unit 340 causes the code, which is outputted by the code generation unit 330 according to the clock signal supplied by the clock signal supply unit 310, to be stored in the shift register 341 until a code sequence of a predetermined length is obtained. At the time, first, the code provided by the code generation unit 330 is held in the right-edge stage of the shift register 341. Then, the code is sequentially shifted to a neighboring stage on the left each time the code is sequentially provided according to the clock signal. Here, as an example, the shift register 341 is assumed as a 15-staged shift resister.

Then, the write control unit 320 provides a write signal and a write address to a code table storage unit 120 according to the clock signal supplied by the clock signal supply unit 310, when the code held by the code sequence holding unit 340 becomes the code sequence of a predetermined length. With this, the code sequence of a predetermined length held by the code sequence holding unit 340 is stored into a destination designated by the write address.

Specifically, first, the write control unit 320 waits for 15 codes to be held by the shift register 341 for a period of 15 clock pulses. Then, at a point when the 15 codes are held in the shift register 341, the write signal and the write address are outputted to the code table storage unit 120. At the time, when address R1 is designated as the write address, a code sequence of codes 1 to 15 is stored in C1 to C15 at address R1.

Next, the write control unit 320 waits for another new 8 codes to be held by the shift register 341 for a period of 8 clock pulses. At a point when the new 8 codes are held in the shift register 341, the write signal and the write address are outputted. At the time, when address R2 is designated as the write address, a code sequence of codes 9 to 23 is stored in C1 to C15 at address R2.

After this, the write control unit 320 repeats the output of the write control signal and the write address at the point when the new 8 codes are held by the shift register 341 until a code sequence is stored in C1 to C15 at address R16. This facilitates rewrite and addition of codes, thereby reducing costs to be incurred for code change. In addition, this also allows the rewrite and addition of codes with the code generation apparatus being equipped on a radar apparatus.

Note that the content of the code table stored in the code table storage unit 120 may be changed, or a different code may be registered in the code table. In addition, an input terminal to which a code sequence is transferred from an external source may be included. This, for example, facilitates the rewrite or addition of a code sequence through previous provision of a circuit that performs wired or wireless communication with an external source, thereby reducing costs to be incurred for code change. Furthermore, this also allows the rewrite and addition of a code sequence with the code generation apparatus being equipped on a radar apparatus.

Note that the code generation apparatus 301 may be implemented by a programmable logic device, such as a Field Programmable Gate Array (FPGA) which allows changes in the circuit structure and the tap position according to specification requirements. Furthermore, a plurality of code sequences serving as a source for a pseudo-noise code may be added to the code table in the order described in the present embodiment, or a plurality of code tables may be stored in the code table storage unit 120 in advance and be switched according to each case where they are used.

Fourth Embodiment

Hereinafter, a fourth embodiment of the present invention shall be described with reference to the drawings.

The spread spectrum radar apparatus in the present invention includes: (g) (g1) a transmission pseudo-noise code generation function identical in structure to the code generation apparatus in the first embodiment, and to generate a transmission pseudo-noise code; (g2) a carrier wave generation function to generate a carrier wave; (g3) a data signal generation function to generate a data signal from predetermined data; (g4) a modulation function to modulate, into a modulated signal, the data signal generated by the data signal generation function, using the carrier wave generated by the carrier wave generation function; (g5) a spread spectrum modulation function to spread-spectrum modulate, into a broad-band signal, the modulated signal obtained through the modulation by the modulation function, using the transmission pseudo-noise code generated by the transmission pseudo-noise code generation function; (g6) a transmission function to transmit, as a radar wave, the broad-band signal obtained through the spread-spectrum modulation by the spread spectrum modulation function; (g7) a reception pseudo-noise code generation function identical in structure to the code generation apparatus in the first embodiment, and to generate a reception pseudo-noise code; (g8) a receiving function to receive, as a received signal, a reflected wave that is obtained when the radar wave is reflected from an object; (g9) a spread spectrum demodulation function to spread-spectrum demodulate, into a correlation signal, the received signal received by the receiving function, using the reception pseudo-noise code generated by the reception pseudo-noise code generation function; (g10) a demodulation function to demodulate, into a data signal, the correlation signal obtained through the spread-spectrum demodulation by the spread spectrum demodulation function, using the carrier wave generated by the carrier wave generation function; and (g11) a signal processing function to process the data signal obtained through the demodulation by the demodulation function.

Note that, as an example here, the spread spectrum radar apparatus, as a transmission pseudo-noise code generation apparatus and a reception pseudo-noise code generation apparatus to be included in the spread spectrum radar apparatus in the present embodiment, is assumed to have the same structure as the code generation apparatus 101 in the first embodiment. However, instead of having the same structure as the code generation apparatus 101 in the first embodiment, the spread spectrum radar apparatus in the present embodiment may have the same structure as the code generation apparatus 201 in the second embodiment, or may have the same structure as the code generation apparatus 301 in the third embodiment.

Based on the above points, a spread spectrum radar apparatus in the present embodiment shall be described. Note that the same numerical references shall be assigned to the constituent elements described in the first embodiment, and the description thereof shall be omitted.

Figure 18:
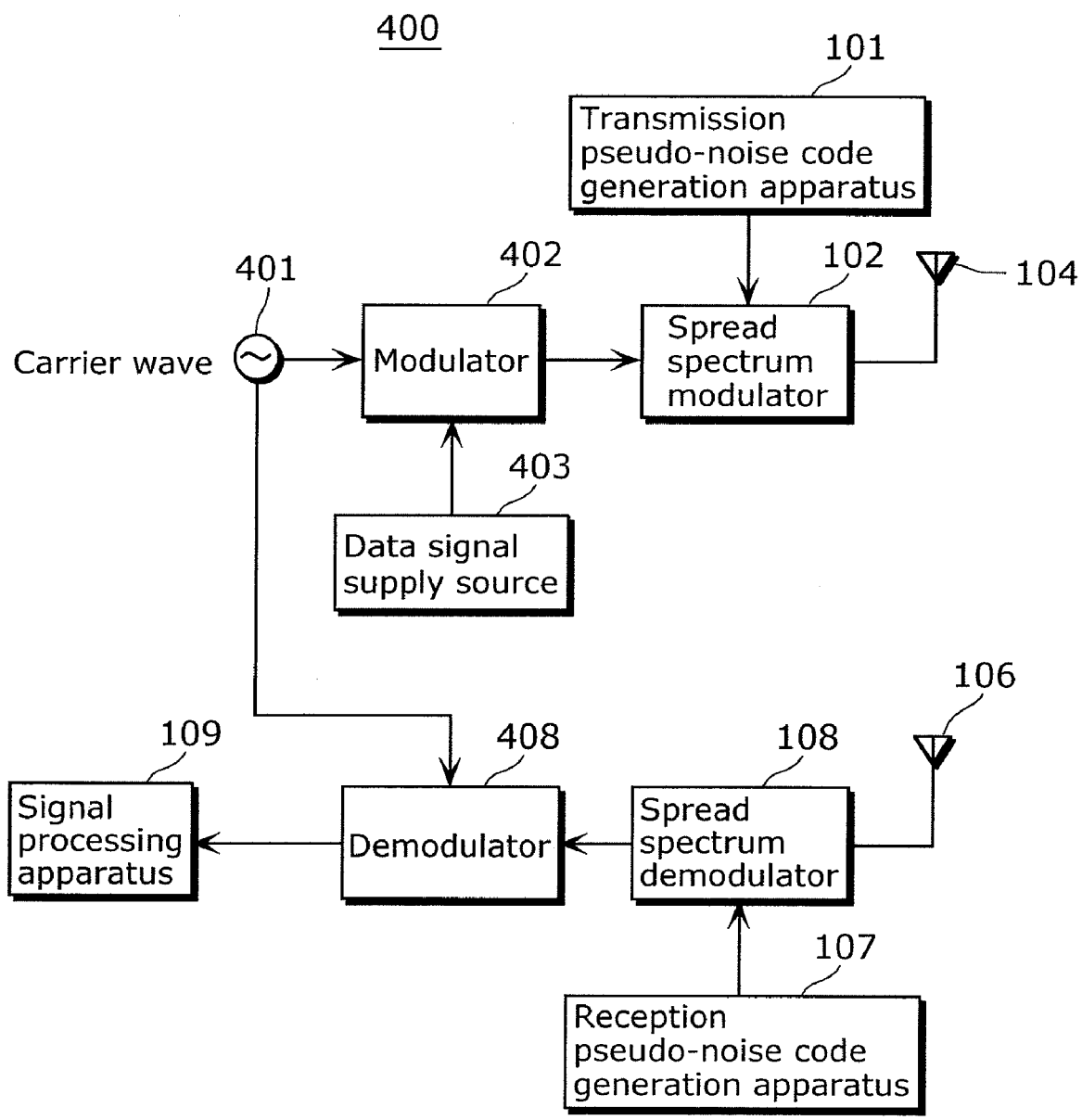
FIG. 18 is a diagram showing the structure of a spread spectrum radar apparatus including a code generation apparatus in a fourth embodiment of the present invention.

FIG. 18 is a diagram showing the structure of the spread spectrum radar apparatus in the present embodiment. As FIG. 18 shows, the spread spectrum radar apparatus 400 differs from the spread spectrum radar apparatus 100 in the first embodiment shown in FIG. 3 in the following points. The spread spectrum radar apparatus 400 further includes: a carrier wave supply source 401, a modulator 402, a data signal supply source 403, and a demodulator 408.

The carrier wave supply source 401 generates a carrier wave, and supplies the generated carrier wave to the modulator 402 and the demodulator 408.

The modulator 402 modulates a data signal supplied by the data signal supply source 403, using the carrier wave supplied by the carrier wave supply source 401. The modulated signal obtained by the modulation is outputted to a spread spectrum modulator 102.

The data signal supply source 403 stores predetermined data, generates a data signal from the stored data, and supplies the generated data signal to the modulator 402.

The demodulator 408 demodulates a correlation signal outputted by the spread spectrum demodulator 108, using the carrier wave supplied by the carrier wave supply source 401. The data signal obtained through the demodulation is outputted to a signal processing apparatus 109.

Note that in this case, the spread spectrum modulator 102 spread-spectrum modulates a modulated signal outputted by the modulator 402, using a transmission pseudo-noise code supplied by the transmission pseudo-noise code generation apparatus 101.

The transmission antenna 104 transmits, as a radar wave, a broad-band signal obtained by the spread-spectrum modulation by the spread spectrum modulator 102.

The receiving antenna 106 receives a reflected wave that is obtained when the radar wave is reflected from an object.

The spread spectrum demodulator 108 spread-spectrum demodulates the received signal that is received by the receiving antenna, using a reception pseudo-noise code supplied by the reception pseudo-noise code generation apparatus 107. The correlation signal obtained by spread-spectrum demodulation is outputted to the demodulator 408.

The signal processing apparatus 109 calculates whether or not an obstacle is present as well as the distance and the relative speed of the obstacle, or transmits data mutually with a radar apparatus of the same kind, based on the data signal outputted by the demodulator 408 and the delay time and so on of the reception pseudo-noise code generation apparatus 107 with respect to the transmission pseudo-noise code generation apparatus 101.

Note that the spread spectrum radar apparatus 400 in the present embodiment may be used only as a data communication apparatus, not as a radar apparatus.

INDUSTRIAL APPLICABILITY

The present invention is applicable as a code generation apparatus or the like included in a radar apparatus using a spread spectrum scheme and so on, and relates particularly to a code generation apparatus or the like included in a short-range radar apparatus or the like requiring for high resolution.

The invention claimed is:

1. A code generation apparatus, comprising:
a clock signal generator configured to generate a clock signal of a first frequency;
a timing signal generator configured to generate, according to the clock signal, a timing signal of a second frequency lower than the first frequency;
a storage in which a plurality of code sequences serving as a source for a pseudo-noise code is stored;
a code sequence selector configured to select, according to the timing signal, a code sequence to be read, from among the plurality of code sequences stored in said storage;
a partial code sequence extractor configured to extract, as a partial code sequence, a code of a predetermined bit length, from the code sequence selected by said code sequence selector; and
a code outputter configured to output, by one bit at a time, according to the clock signal, the partial code sequence extracted by said partial code sequence extractor.

2. The code generation apparatus according to claim 1, wherein, in said storage, a bit width of a data bus at an output side to said partial code sequence extractor is at least 2X−1 bit, where the partial code sequence is X bit in size, and where the code sequence is at least 2X−1 bit in size.

3. The code generation apparatus according to claim 1, wherein, in said storage, a storage area in which the code sequence is stored is a continuous space of at least 2X−1 bit, where the partial code sequence is X bit in size, and where the code sequence is at least 2X−1 bit in size.

4. The code generation apparatus according to claim 1, wherein, in said storage, X−1 bit data from a code sequence that is subsequently selected by said code sequence selector is stored in an X−1 bit storage area succeeding an X-bit code in the code sequence currently selected, where the partial code sequence is X bit in size, and where the code sequence is at least 2X−1 bit in size.

5. The code generation apparatus according to claim 1, wherein said partial code sequence extractor includes:

a first partial code sequence extractor configured to read a first code sequence part from the code sequence selected by said code sequence selector, and to extract a first code of a predetermined bit length from the first code sequence part;

a second partial code sequence extractor configured to read a second code sequence part from the code sequence selected by said code sequence selector, and to extract a second code of a predetermined bit length from the second code sequence part; and a partial code sequence selector configured to alternately select said first partial code sequence extractor and said second partial code sequence extractor, and to output, as the partial code sequence, the one of the first and second codes of a predetermined bit length that is extracted by the selected one of said first and second partial code sequence selection units.

6. The code generation apparatus according to claim 1, comprising:

a code generator configured to generate a pseudo-noise code;

a code holder configured to hold a 2X−1 bit code from the pseudo-noise code generated by said code generator; and a write controller configured to cause: initially, the 2X−1 bit code from the code held by said code holder to be stored in a predetermined storage destination in said storage, when the 2X−1 bit code is held by said code holder; and, subsequently, a new 2X−1 bit code newly held by said code holder to be stored in a new storage destination in said storage, when the new X-bit code is held by said code holder.

7. A spread spectrum radar apparatus, comprising:

a transmission pseudo-noise code generator identical in structure to the code generation apparatus according to claim 1, and configured to generate a transmission pseudo-noise code;

a carrier wave generator configured to generate a carrier wave;

a data signal generator configured to generate a first data signal from predetermined data;

a modulator configured to modulate the first data signal into a modulated signal, using the carrier wave generated by said carrier wave generator, the first data signal being generated by said data signal generator;

a spread spectrum modulator configured to spread-spectrum modulate the modulated signal into a broad-band signal, using the transmission pseudo-noise code generated by said transmission pseudo-noise code generator, the modulated signal being obtained through the modulation by modulator;

a transmitter configured to transmit, as a radar wave, the broad-band signal obtained through the spread-spectrum modulation by said spread spectrum modulator;

a reception pseudo-noise code generator identical in structure to the code generation apparatus according to claim 1, and configured to generate a reception pseudo-noise code;

a receiver configured to receive, as a received signal, a reflected wave that is obtained when the radar wave is reflected from an object;

a spread spectrum demodulator configured to spread-spectrum demodulate the received signal into a correlation signal, using the reception pseudo-noise code generated by said reception pseudo-noise code generator, the received signal being received by said receiver;

a demodulator configured to demodulate the correlation signal into a second data signal, using the carrier wave generated by said carrier wave generator, the correlation signal being obtained through the spread-spectrum demodulation by said spread spectrum demodulator; and a signal processor configured to process the second data signal obtained through the demodulation by said demodulator.

8. A radar apparatus comprising the code generation apparatus according to claim 1, as one of a transmission pseudo-noise code generation apparatus and a reception pseudo-noise code generation apparatus.

9. A spread spectrum apparatus comprising the code generation apparatus according to claim 1, as a pseudo-noise code generation apparatus.

\* \* \* \* \*